(12) United States Patent
Jacobs et al.

(10) Patent No.: US 7,587,327 B2
(45) Date of Patent: Sep. 8, 2009

(54) ORDER SCHEDULING SYSTEM AND METHOD FOR SCHEDULING APPOINTMENTS OVER MULTIPLE DAYS

(75) Inventors: Simon Jacobs, Vancouver (CA); John Thomas, Kamloops (CA); Rob Anthony, St. John's (CA)

(73) Assignee: Ventyx Software SRL., St. Michael (BB)

( * ) Notice: Subject to any disclaimer, the term of this patent is extended or adjusted under 35 U.S.C. 154(b) by 762 days.

(21) Appl. No.: 09/825,296

(22) Filed: Apr. 2, 2001

(65) Prior Publication Data
US 2002/0010610 A1   Jan. 24, 2002

Related U.S. Application Data

(60) Provisional application No. 60/193,705, filed on Mar. 31, 2000, provisional application No. 60/193,832, filed on Mar. 31, 2000, provisional application No. 60/193,833, filed on Mar. 31, 2000, provisional application No. 60/193,834, filed on Mar. 31, 2000, provisional application No. 60/193,917, filed on Mar. 31, 2000.

(51) Int. Cl.
*G06Q 10/00* (2006.01)
(52) U.S. Cl. .............................. 705/8; 705/9
(58) Field of Classification Search ............. 705/8, 705/9
See application file for complete search history.

(56) References Cited

U.S. PATENT DOCUMENTS

| | | | |
|---|---|---|---|
| 4,937,743 A | 6/1990 | Rassman et al. | 364/401 |
| 5,093,794 A | 3/1992 | Howie et al. | 364/468 |
| 5,113,380 A | 5/1992 | Levine | 368/10 |
| 5,168,451 A | 12/1992 | Bolger | 364/436 |
| 5,289,368 A | 2/1994 | Jordan et al. | 364/401 |

(Continued)

FOREIGN PATENT DOCUMENTS

DE    195 39 662 C2    10/1997

(Continued)

OTHER PUBLICATIONS

MDSI Mobile Data Solutions, www.mdsi-advantex.com, Dec. 2, 1998 (retrieved Apr. 11, 2005, updated search Jun. 8, 2005), pp. 1-31. [google.com, archive.com].*

(Continued)

*Primary Examiner*—Andre Boyce
(74) *Attorney, Agent, or Firm*—Dorsey & Whitney LLP

(57) ABSTRACT

A system and method schedules splittable work orders to provide customers with requested service and efficiently utilize service resources. The method includes forming a list of appointment windows for days on which service may be performed. A request for service from a customer is identified as being a splittable work order. The splittable work order is assigned a job duration required to complete the order and a split time less than the job duration. An appointment window on a first day during which a portion of the service may be scheduled is determined. The appointment window is for the split time in duration. At least one appointment window on a subsequent day or days during which the remainder of the service may be scheduled is then determined. The splittable work order is scheduled by assigning the work order to the determined appointment windows on the determined first and subsequent days.

14 Claims, 4 Drawing Sheets

U.S. PATENT DOCUMENTS

| | | |
|---|---|---|
| 5,289,531 A | 2/1994 | Levine ............... 379/93 |
| 5,325,292 A | 6/1994 | Crockett ............. 364/401 |
| 5,355,511 A | 10/1994 | Hatano et al. ........ 455/11.1 |
| 5,428,546 A | 6/1995 | Shah et al. .......... 364/449 |
| 5,467,268 A | 11/1995 | Sisley et al. ........ 364/401 |
| 5,524,077 A | 6/1996 | Faaland et al. ....... 364/402 |
| 5,532,702 A | 7/1996 | Mintz ................ 342/463 |
| 5,590,269 A | 12/1996 | Kruse et al. ......... 395/209 |
| 5,615,121 A * | 3/1997 | Babayev et al. ....... 705/9 |
| 5,623,404 A | 4/1997 | Collins et al. ....... 395/209 |
| 5,636,122 A | 6/1997 | Shah et al. .......... 364/449.1 |
| 5,655,118 A | 8/1997 | Heindel et al. ....... 395/614 |
| 5,737,728 A | 4/1998 | Sisley et al. ........ 705/8 |
| 5,758,313 A | 5/1998 | Shah et al. .......... 701/208 |
| 5,764,953 A | 6/1998 | Collins et al. ....... 395/500 |
| 5,774,661 A | 6/1998 | Chatterjee et al. .... 395/200.33 |
| 5,774,867 A | 6/1998 | Fitzpatrick et al. ... 705/8 |
| 5,826,239 A | 10/1998 | Du et al. ............ 705/8 |
| 5,848,395 A * | 12/1998 | Edgar et al. ......... 705/9 |
| 5,870,545 A | 2/1999 | Davis et al. ......... 395/200.31 |
| 5,893,906 A | 4/1999 | Daffin et al. ........ 705/28 |
| 5,904,727 A | 5/1999 | Prabhakaran .......... 701/208 |
| 5,913,201 A * | 6/1999 | Kocur ................ 705/9 |
| 5,920,846 A | 7/1999 | Storch et al. ........ 705/7 |
| 5,922,040 A | 7/1999 | Prabhakaran .......... 701/117 |
| 5,963,913 A | 10/1999 | Henneuse et al. ...... 705/9 |
| 5,970,466 A | 10/1999 | Detjen et al. ........ 705/8 |
| 6,016,477 A | 1/2000 | Ehnebuske et al. ..... 705/7 |
| 6,047,260 A | 4/2000 | Levinson ............. 705/9 |
| 6,070,144 A | 5/2000 | Ginsberg et al. ...... 705/9 |
| 6,088,626 A | 7/2000 | Lilly et al. ......... 700/100 |
| 6,092,048 A | 7/2000 | Nakaoka .............. 705/9 |
| 6,115,640 A | 9/2000 | Tarumi ............... 700/99 |
| 6,144,971 A | 11/2000 | Sunderman et al. ..... 707/500 |
| 6,219,412 B1 | 4/2001 | Wellner et al. ....... 379/202 |
| 6,278,978 B1 | 8/2001 | Andre et al. ......... 705/9 |
| 6,415,259 B1 | 7/2002 | Wolfinger et al. ..... 705/8 |
| 6,430,562 B1 * | 8/2002 | Kardos et al. ........ 707/10 |
| 6,473,748 B1 | 10/2002 | Archer ............... 706/45 |
| 6,484,036 B1 | 11/2002 | Sorkin et al. ........ 455/508 |
| 6,532,465 B2 | 3/2003 | Hartley et al. ....... 707/10 |
| 6,535,883 B1 | 3/2003 | Lee et al. ........... 707/100 |
| 6,546,364 B1 | 4/2003 | Smirnov et al. ....... 703/22 |
| 6,546,425 B1 | 4/2003 | Hanson et al. ........ 709/227 |
| 6,578,005 B1 * | 6/2003 | Lesaint et al. ....... 705/8 |
| 6,633,900 B1 | 10/2003 | Khalessi et al. ...... 709/202 |
| 6,697,784 B2 | 2/2004 | Bacon et al. ......... 705/9 |
| 6,701,299 B2 | 3/2004 | Kraisser et al. ...... 705/8 |
| 6,721,288 B1 | 4/2004 | King et al. .......... 370/310 |
| 6,745,381 B1 | 6/2004 | Ehnebuske et al. ..... 717/100 |
| 6,754,321 B1 | 6/2004 | Innes et al. ......... 379/201.03 |
| 6,823,315 B1 | 11/2004 | Bucci et al. ......... 705/9 |
| 6,850,895 B2 | 2/2005 | Brodersen et al. ..... 705/9 |
| 7,127,412 B2 | 10/2006 | Powell et al. ........ 705/9 |
| 2001/0029499 A1 | 10/2001 | Tuatini et al. ....... 706/47 |
| 2001/0037229 A1 | 11/2001 | Jacobs et al. ........ 705/8 |
| 2001/0047287 A1 | 11/2001 | Jacobs et al. ........ 705/9 |
| 2001/0047288 A1 | 11/2001 | Jacobs et al. ........ 705/9 |
| 2001/0049619 A1 * | 12/2001 | Powell et al. ........ 705/9 |
| 2002/0007299 A1 | 1/2002 | Florence ............. 705/9 |
| 2002/0010615 A1 | 1/2002 | Jacobs ............... 705/9 |
| 2002/0016645 A1 | 2/2002 | Jacobs et al. ........ 700/100 |
| 2002/0023157 A1 | 2/2002 | Lo et al. ............ 709/227 |
| 2002/0035493 A1 | 3/2002 | Mozayeny et al. ...... 705/5 |
| 2002/0046073 A1 | 4/2002 | Indseth et al. ....... 705/8 |
| 2002/0065700 A1 * | 5/2002 | Powell et al. ........ 705/9 |
| 2002/0199182 A1 | 12/2002 | Whitehead ............ 725/1 |
| 2005/0027580 A1 | 2/2005 | Crici et al. ......... 705/8 |

FOREIGN PATENT DOCUMENTS

| | | |
|---|---|---|
| WO | WO 00/28451 A3 | 5/2000 |
| WO | WO 00/68856 | 11/2000 |
| WO | WO 00/68859 | 11/2000 |

OTHER PUBLICATIONS

Adhikari, R., "Scheduling Solutions", Information Week, www.informationweek.com, Apr. 1998. 7 pages.

Alanko T. et al., "Mowgli: Improvements for Internet Applications Using Slow Wireless Links", The 8th IEEE International Symposium on Personal, Indoor and Mobile Radio Communications, vol. 3, 1997. pp. 1038-1042.

ClickSchedule, Products, Click Schedule Tour and Article Web pages, ClickService Software, Inc., www.clickservice.com/products, 2000 (retrieved Feb. 2005). 12 pages.

Gunes, E.D., "Workforce Scheduling", Department of Industrial Engineering Bilkent University, Apr. 1999. 1-11.

ILOG.com, "ILOG Dispatcher Field Service Dispatcher", ILOG Worldwide (retrieved from archive.org), Dec. 2000 (retrieved Feb. 2005). 2 pages.

ILOG.com, ILOG World Leader in software components, Business Rules, Rule Engine, Rule Language, Rule Kit, Constraint Base Scheduling, ILOG Dispatcher Web pages, www.ilog.com/products/rules, 2000 (retrieved Feb. 2005). 21 pages.

Keller, A. et al., "Zippering: Managing intermittent connectivity in DIANA", Mobile Networks and Application, Baltzer Science Publishers BV, Netherlands, vol. 2, No. 4, 1997. pp. 357-364.

Kleinrock, L., "Nomadicity: Anytime, anywhere in a disconnected world", Mobile Networks and Applications, Journal of Special Topics in Mobile Networks and Applications, J.C. Baltzer AG, Science Publishers, Netherlands, vol. 1, No. 4, pp. 351-357.

LaPorta T.F. et al., "Challenges for nomadic computing: Mobility management and wireless communications", Mobile Networks and Applications, Journal of Special Topics in Mobile Networks and Applications, J.C. Baltzer AG, Science Publishers, Netherlands, vol. 1, No. 1, Aug. 1996. pp. 3-16.

Livneh, E., "Case Study: Automating Service Allocation and Scheduling", Association for Services Management International, www.afsmi.org, May 1997. pp. 1-5.

Marshak, R.T, "ClickSchedule: Completing the Online Buying Experience", ClickSoftware, Patrica Seybold Group, Oct. 1999. pp. 1-3.

Mazer, M.S. et al., "Writing the Web While Disconnected", IEEE Personal Communications, vol. 5, No. 5, Oct. 1998. pp. 35-41.

Mummert L. et al., "Exploiting Weak Connectivity for Mobile File Access", Fifteenth AC Symposium on Operating Systems Principles, Colorado, vol. 29, No. 5, Dec. 1995. pp. 143-155

Open Wave—Home and Shift Track Web pages, www.open-wave.com (retrieved from archive.org), Open Wave, Inc., 1999. 5 pages.

Padwick, G. et al, Special Edition Using Microsoft® Outlook® 2000, Que, ISBN 0-7897-1909-6, May 1999. 47 pages.

Blumberg, D., "Optimizing Mobile Workforce", Leisure Publications, Feb. 1, 2001.

"DeliveryNet for Home Delivery", www.Descartes.com, e-Fulfillment Solutions, Mar. 20, 2000. Nine pages.

DiCarlo, L., "Connectria: E-scheduling is next big thing", eWeek, Mar. 20, 2000. pp. 1-3.

Domenjoud, E. et al., "Generating feasible schedules for a pick-up and delivery problem", Proceedings of CP, Technical Report 98-R-142, Apr. 1998. pp. 1-12.

Dumas, Y. et al., "Pickup and Delivery Problem with Time Windows", European Journal of Operational Research, vol. 54, No. 1, Sep. 1991. Abstract only. One page.

Mitrovic-Minic, S., "Pickup and Delivery Problem with Time Windows: A Survey", SFU CMPT TR 1998-12, ftp://fas.sfu.ca/pub/cs/techreports/1998, May 1998. pp. 1-43.

Nanry, W.P. et al., "Solving the pickup and delivery problem with time windows using reactive tabu search", Transportation Research, Part B, Apr. 1999. pp. 107-121.

"Scheduling Software Helps Webvan Meet 30-Minute Delivery Window", Stores Magazine, NRF Enterprises, Inc., Jul. 2000. 2 pages.

Sciacca, P., "Webvan Gets E-Business Software for Expansion", Supermarket News, Jan. 2000. Two pages.

Solomon, M.M., "Algorithms for the Vehicle Routing and Scheduling Problems with Time Window Constraints", Operations Research, vol. 35, No. 2, Mar.-Apr. 1987. pp. 254-265.

"Vantive and MDSI to Provide Enterprise-Wide Wireless Field Service Solution", PR Newswire, New York, Oct. 26, 1998. pp. 1-3.

Witt, C.E., "Update: Material Handling in the Food Industry", Material Handling Engineering, vol. 54, No. 11, Oct. 1999. Eleven pages.

Bisio, R. et al., "Effective Resource Scheduling in Work Force Management Context for Telecommunication Work Centers", Torino, Italy, CPAIOR, 1999. Five pages.

Collins, J.E. et al., "Automated Assignment and Scheduling of Service Personnel", IEEE Expert, Apr. 1994. pp. 33-39.

Guido, B. et al, "Work Force Management (WFM) Issues", Network Operations and Management Systems, IEEE 1998. pp. 473-482.

Jing, J. et al., "WHAM: Supporting Mobile Workforce and Applications in Workflow Environments", Research Issues in Data Engineering, RIDE 2000, Feb. 2000. Eight pages.

Lesaint, D. et al., "Dynamic Workforce Management", The Institution of Electrical Engineers, IEE Colloquium on AI for Network Management Systems, 1997. pp. 1-5.

Lesaint, D. et al., "Dynamic Workforce Scheduling for British Telecommunications plc", Interfaces, vol. 30, No. 1, Jan.-Feb. 2000. pp. 45-52.

Aytug, H. et al., "A Review of Machine Learning in Scheduling", IEEE Transactions on Engineering Management, vol. 41, No. 2, May 1994. pp. 165-171.

"Connectria Unveils ServeClick to Enable the Next Wave of E-Commerce—'E-Scheduling' of Services, Appointments & Reservations", Business Wire, New York, Jan. 4, 2000. Two pages.

De Serres, Y., "Simultaneous optimization of flow control and scheduling in queues", McGill University, Publication No. AAT NN72160, 1991. Abstract only, one page.

Marinho J. et al., "Decision Support System for Dynamic Production Scheduling", IEEE International Symposium on Assembly and Task Planning, Jul. 1999. pp. 424-429.

Martin, J., "Principles of Object-Oriented Analysis and Design", PTR Prentice Hall, New Jersey, 1993. pp. vii-xiii and 133-154

McFeely, D.J. et al., "Scheduling to Achieve Multiple Criteria in an Air Force Depot CNC Machine Shop", Production and Inventory Management Journal, vol. 38, No. 1, First Quarter 1997. 72-79.

"MenuHunter.com to Provide the Ultimate in Online Restaurant Reservations Using ServeClick from Connectria; Service to Handle Complex, Real-World Needs of Restaurants & Patrons", Business Wire, New York, Feb. 1, 2000. Three pages.

Panwalker, S.S. et al., "A Survey of Scheduling Rules", Operations Research, vol. 25, No. 1, Jan.-Feb. 1977. pp. 45-61.

Pierreval, H. et al., "Dynamic Selection of Dispatching Rules for Manufacturing System Scheduling", International Journal Production Research, vol. 35, No. 6, 1997. pp. 1575-1591.

"RestaurantRow.com Selects ServeClick from Connectria to Power its Advanced Online Restaurant E-Scheduling", PR Newswire, New York, Feb. 1, 2000. Three pages.

"SERVECLICK", U.S. Trademark Application 75914207, Applicant: Catalyst Solutions Group, Inc., filed Feb. 9, 2000, abandoned Feb. 17, 2001. One page.

"ServeClick.com" Web pages retrieved from archive.org on Apr. 2006, ServeClick, 1999-2000. pp. 1-13.

Tkach, D. et al., "Visual Modeling Technique Object Technology Using Visual Programming", Addison-Wesley, 1996. pp. 324-336.

Balakrishnan, N., "Simple Heuristics for the Vehicle Routeing Problem with Soft Time Windows", The Journal of the Operational Research Society, vol. 44, No. 3, Mar. 1993. pp. 279-287.

Ferland, J. et al., "Vehicles scheduling with sliding time windows", www.sciencedirect.com, European Journal of Operational Research, vol. 38, Issue 2, Jan. 1989. Two pages.

Johns, S., "Heuristics to Schedule Service Engineers Within Time Windows", Journal of the Operational Research Society, vol. 46, No. 3, 1995. pp. 339-346.

Larsen, A., "The Dynamic Vehicle Routing Problem", Lyngby 2000. pp. i-192.

Liu, F. et al., "A route-neighborhhod-based metaheuristic for vehicle routing problem with time windows", European journal of Research, vol. 118, 1999. pp. 485-504.

Smith, S., "Reactive Scheduling Systems", Center for Integrated Manufacturing Decision Systems, The Robotics Institute, Carnegie Mellon University, Intelligent Systems, 1994. pp.1-38.

* cited by examiner

ORDER SCHEDULING SYSTEM AND METHOD FOR SCHEDULING APPOINTMENTS OVER MULTIPLE DAYS

CROSS-REFERENCE TO RELATED APPLICATION

This application claims the benefit of U.S. provisional applications 60/193,834, 60/193,917, 60/193,832, 60/193,705 and 60/193,833, each of which was filed Mar. 31, 2000 and each of which is incorporated herein by reference.

TECHNICAL FIELD

The present invention relates generally to a computer system and method for scheduling appointments to provide a particular service to a customer, and, more specifically, to a computer system and method for scheduling such appointments over multiple days.

COPYRIGHT NOTICE—PERMISSION

A portion of the disclosure of this patent document contains materials which are subject to copyright protection. The copyright owner has no objection to the facsimile reproduction by anyone of the patent document or the patent disclosure as it appears in the Patent and Trademark Office patent files or records, but otherwise reserves all copyrights rights whatsoever. The following notice applies to the software and data as described below and in the drawings attached hereto: Copyright © 2001, MDSI Mobile Data Solutions, Inc., All Rights Reserved.

BACKGROUND OF THE INVENTION

In a variety of industries, such as the utility and telecommunications industries, companies providing service to customers in the field (i.e., at the customer's physical location) must manage the way in which customer service appointments are booked or scheduled. Efficient scheduling of customer service orders, which include the appointment time and the type of service being provided, allows the company to offer convenient appointments to customers, make quality commitments in regard to these appointments, and reduce costs associated with performing the services being provided. FIG. 1 illustrates a conventional order scheduling system 100 in which a company 102 provides service to a number of customers C1-C3 located in a geographic region 104 being serviced by the company. Typically, the geographic region 104 is divided into a number of areas AREA1-AREA3 and one or more field service representatives FSR1-FSR3 are assigned to perform service in each area.

To obtain service, the customers C1-C3 contact customer service representatives CSR1-CSR3 of the company 102 over respective communications links 106-110, which are typically conventional telephone lines but may also be other suitable communications links. In response to being contacted, the corresponding customer service representative CSR1-CSR3 accesses a scheduling program 114 on a computer system 112 and generates a work order to schedule the requested service. The work order includes the type of service to be performed and the appointment time for performing the service.

In generating the work order, the customer service representative CSR1-CSR3 inputs the type of work to be performed and the requested day of service into the scheduling program 114. From this input, the program 114 determines the job duration, which is the time required to provide the requested service. The scheduling program 114 then determines what appointment times are available on the day for which service is requested. Appointment times are typically defined by dividing a day into a number of appointment windows AW, each window being a time during which an appointment may be scheduled. FIG. 1 illustrates an example day having four appointment windows AW1-AW4 of one, two, two, and four hours, respectively. The scheduling program 114 identifies the available appointment windows AW1-AW4 on the requested day of service and then schedules the work order in one or more available windows, depending on the job duration and the duration of the available windows. For example, if the job duration JD is five hours and time windows AW1-AW3 are available on the requested day, the program 114 schedules the work order in these windows.

The process of scheduling work orders executed by the scheduling program 114 is nontrivial if the company wants to optimally utilize it resources in servicing its customers. Variables such as the skill levels of individual field service representatives FSR1-FSR3, break times of the representatives, the need to give priority to certain work orders, and numerous other factors make it difficult for a company to rely on scheduling work orders using conventional scheduling programs 114. One particular factor that results in the inefficient use of corporate resources occurs when "splittable orders" are involved. A splittable order is a work order that may be split over several days in performing the requested service even if, for example, the total job duration is less than the number of service hours available in a given day. Splittable orders allow service to be provided in segments over multiple days and many times allow earlier completion of a job than would be possible if scheduling of the order is delayed until a day is available on which the job may be completed in its entirety. An example of a splittable order is the routing of an underground cable between two buildings. To perform this work, a trench may be dug on a first day, the cable routed a second day, and the cable covered on a third day.

Conventional scheduling programs 114 process splittable orders in the same way as nonsplittable orders, which are orders that must be started and completed on the same day. In other words, the program 114 identifies a day having sufficient available appointment windows AW and schedules the order in such windows on the identified day. Scheduling splittable orders in this way can result in the inefficient use of company resources and delay providing requested services to customers. For example, if a splittable order has a total job duration SJD (see FIG. 1) of five hours and only appointment window AW4 is available on the requested day, the scheduling program 114 will notify the customer service representative CSR1-CSR3 that the order cannot be scheduled on the requested day and may suggest another day on which sufficient appointment windows are available. As a result, the window AW4 on the requested day may not be utilized to provide service to a customer, thus resulting in wasted time and revenues for the company. Moreover, delaying scheduling of the order until a day on which the order can be completed may delay providing the service to the customer, potentially causing customer dissatisfaction due the company's inability to complete the requested work until a later date.

There is a need for a computer system and method for enhancing the efficiency of the scheduling process to allow a company to efficiently utilize its resources while meeting customer expectations.

SUMMARY OF THE INVENTION

According to one aspect of the present invention, a method for scheduling splittable work orders to provide customers with requested service and efficiently utilize service resources includes forming a list of appointment windows for days on which service may be performed. A request for service from a customer is identified as being a splittable work order. The splittable work order is assigned a job duration required to complete the order and a split time that is less than the job duration. An appointment window on a first day during which a portion of the service to complete the work order may be scheduled is determined. The appointment window is for the split time in duration. At least one appointment window on a subsequent day or days during which the remainder of the service to complete the work order may be scheduled is then determined. The splittable work order is scheduled by assigning the work order to the determined appointment windows on the first day and subsequent day or days.

DETAILED DESCRIPTION OF THE INVENTION

Figure 1:
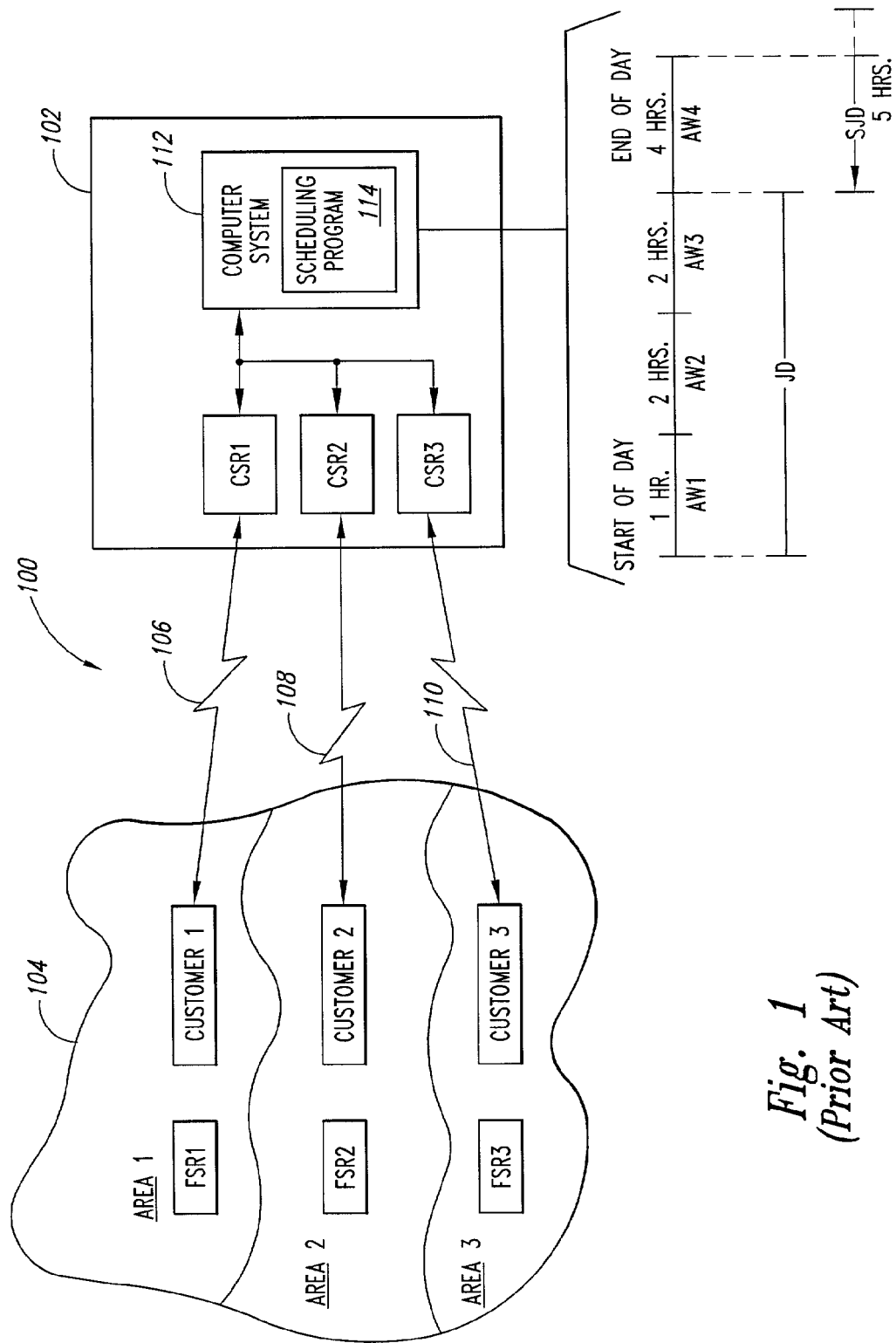
FIG. 1 is block diagram illustrating a conventional order scheduling system for allowing a company to schedule service appointments with customers.
Figure 2:
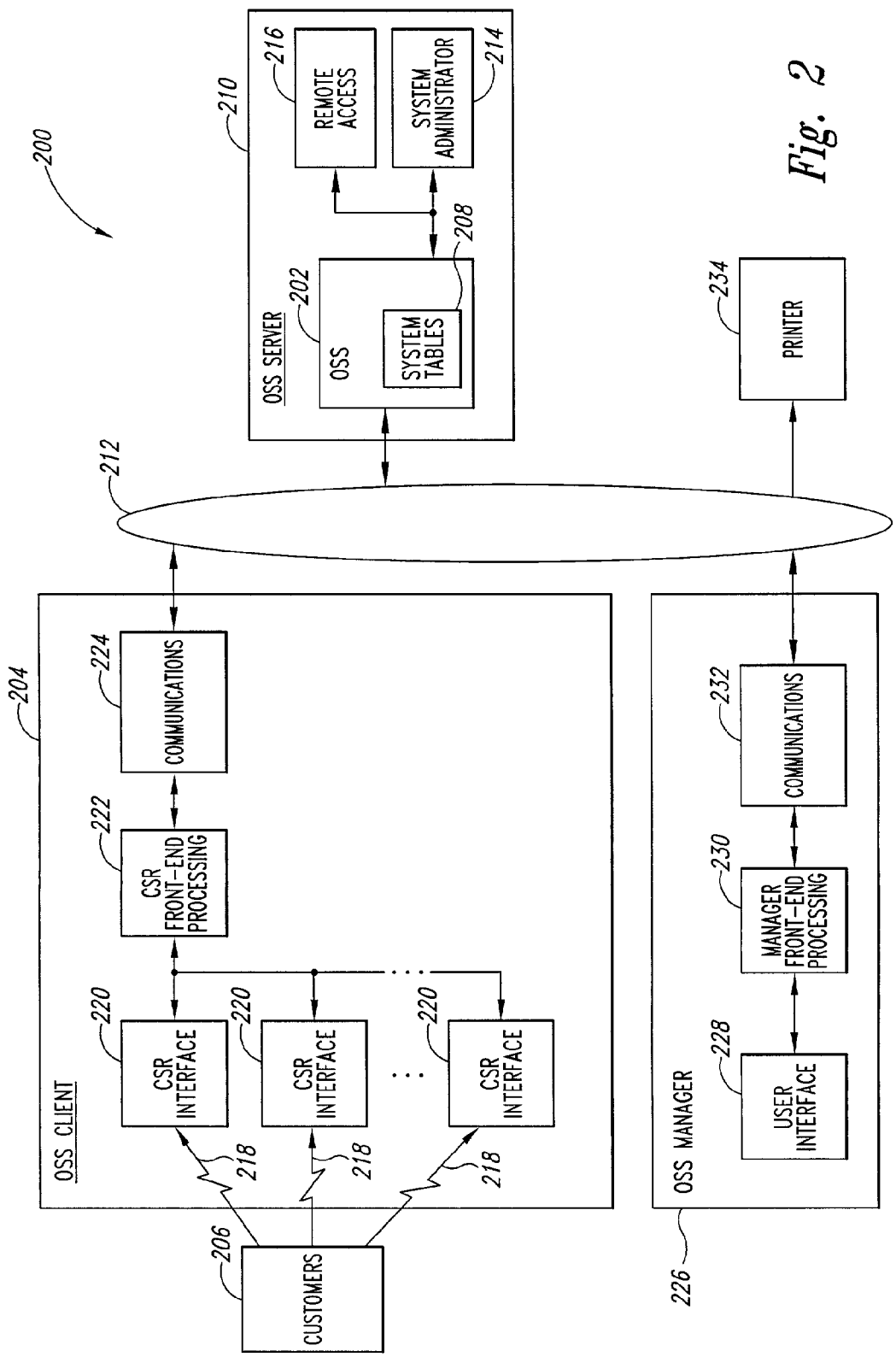
FIG. 2 is a block diagram illustrating an order scheduling system for allowing a company to schedule splittable orders with customers according to one embodiment of the present invention.

FIG. 2 is a block diagram illustrating one embodiment of an order scheduling system 200 including an order scheduling system (OSS) component 202 that allows an OSS client having an OSS client computer system 204, which is typically a service-based organization, to schedule splittable and nonsplittable work orders for providing services to customers 206. By providing the flexibility to schedule splittable and nonsplittable work orders, the OSS component 202 provides the client with a software solution that enables the client to efficiently utilize the client's service resources and satisfy customer demands for prompt responses to service requests, as will be explained in more detail below. In the following description, certain details are set forth to provide a sufficient understanding of the invention. However, it will be clear to one skilled in the art that the invention may be practiced without these particular details. In other instances, well-known circuits, control and timing protocols, and software operations have not been shown in detail in order to avoid unnecessarily obscuring the invention.

In the order scheduling system 200, users are grouped into three different classes, and each class corresponds to a distinct operational role. Individual users are assigned to a user class when their system account is set up, and they have access to functions that correspond to their user class. Users can be divided into three classes: OSS Client, System Administrator, and Manager, as will be described in more detail below. Each function of the OSS component 202 is associated with one or more OSS user classes. The OSS component 202 executes on a server computer system or server 210 that communicates with the client computer system 204 over a communications network 212, such as the Internet. A System Administrator component 214 on the server 210 interfaces with the OSS component 202 to allow a system administrator to configure system tables 208 in the OSS component. The System Administrator component 214 typically includes a console including a monitor and keyboard for allowing system administrator to input and display configuration information for the OSS component 202. The System Administrator establishes the initial system configuration of the OSS component 202 by setting up the system tables 208, such as shifts, job codes, and window hierarchies, as will be described in more detail below, and also maintains the OSS component during startup, shutdown, and backups of the system. The System Administrator role is typically performed by a Management Information Services (MIS) specialist, and such a person or organization need not be familiar with dispatching operations. The System Administrator can also perform some of the functions of the Manager, although this is not the System Administrator's traditional operational role. A remote access component 216 also executes on the server 210, which is typically a modem, provides remote access to the OSS component 202 and allows the developer of the OSS component, which is Mobile Data Solutions Inc. (MDSI), to remotely diagnose system problems and provide customer support.

The OSS client corresponds to a service-based organization that schedules work orders utilizing the OSS component 202 as previously mentioned. The client utilizes the client computer system 204 having a number of components that allow Customer Service Representatives of the client to communicate with the OSS component over the network 212 and schedule work orders. More specifically, a plurality of customer service representative communicate with customers 206 over suitable communication links 218, such as conventional telephone lines, and interface with the system 200 through respective customer service representative (CSR) interfaces 220. The interfaces 220 display scheduling information to the customer service representatives and allow representatives to input scheduling information. A CSR front-end processing component 222 processes data from the interfaces 220 and provides the process data to a communications component 224 which, in turn, communicates scheduling information to and from the OSS component 202 over the network 212.

Depending on the nature of the OSS client, the OSS client computer system may be either a single host computer, such as a mainframe, or to several individual workstations for respective customer service representatives. When the system 204 is a host computer, the interfaces 220, front-end processing component 222, and communications component 224 operates as previously described to manage multiple customer service representative sessions, provide a user interface and front-end processing for each customer service representative, and serialize communications with the OSS component 202 over the commutations network 212. When the system 204 corresponds to a plurality of individual workstations, which are typically personal computers, each workstation includes an interface 220, front-end processing component 222, and communications component 224 for a single customer service representative, and each workstation communicates directly with the OSS component 202. The OSS component 202 typically communicates with several workstation-type OSS clients. Regardless of whether the client computer system 204 corresponds to several workstations or a mainframe, the OSS component 202 treats each such system as an external computer interface, and simply communicates data to and from each system regardless of the type of system. In one implementation of the system 200, the developer of the OSS component 202, MDSI, does not provide the software for implementing the interfaces 220 or front-end processing component 222, but instead the client (i.e., the utility, telecommunications, or other service-based company) is responsible for developing such client software and also for developing the software for the client side (i.e., between the front-end processing component and the communications component 224) of the communication interface with the component 224.

The order scheduling system 200 further includes an OSS manager computer system 226 including a user interface 228, manager front-end processing component 230, and communications component 232 that operate in combination in a similar manner to that previously described for the corresponding components in the OSS client computer system 204. Thus, for the sake of brevity, the components 228-232 will not be described in more detail. The Manager maintains the system tables 208 in the OSS component 204, and determines resource availability by assigning individual FSRs to specific shifts. The Manager's role is performed by a user who is familiar with the dispatching operations. The Manager is also may also maintain the OSS component 202 as previously described for the System Administrator and can perform all the functions of the System Administrator, although this is not typically a primary function of the Manager. The system 200 may also include additional peripheral devices, such as a printer 234 for allowing the Manager, System Administrator, and/or Customer Service Representatives, depending on the physical location of the printer, to print desired information regarding the system 200.

Before describing the overall operation of the system 200 in scheduling work orders, the system tables 208 contained in the OSS component 202 will first be described in more detail. The system tables 208 contain store basic configuration information, such as the definitions of work areas, shifts, and appointment windows, each of which will be described in more detail below. This information is used to validate user requests, determine the resources needed to complete appointments, and determine the resources available for booking appointments. Information in system tables 208 is configured initially by the System Administrator, and is maintained by the Manager. The OSS component 202 contains the following system tables 208: Skill codes; Job codes; Users; Field Service Representatives (FSR); Shifts; Areas; Window hierarchies; and Booking patterns.

Figure 3:
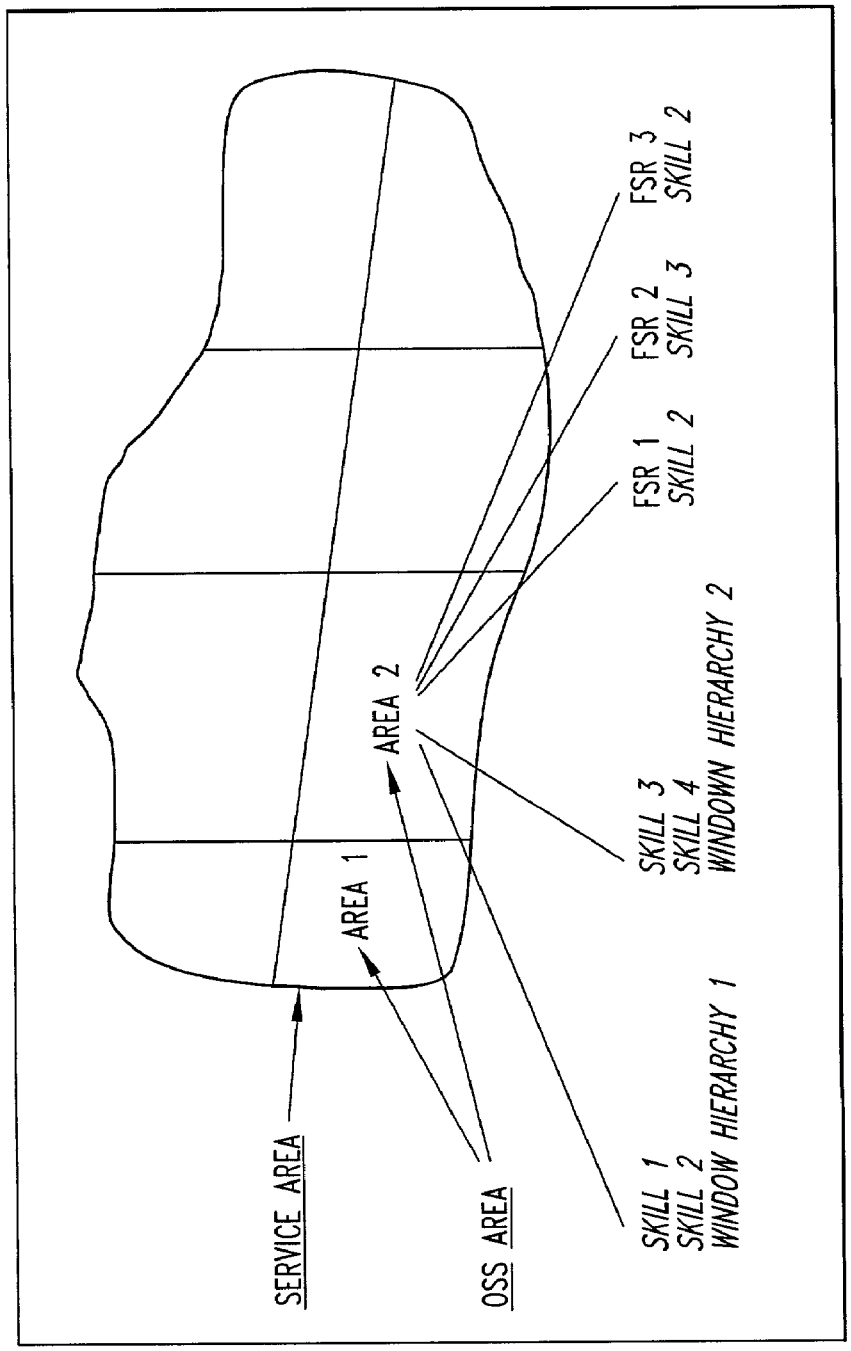
FIG. 3 is a diagram illustrating various relationships among system table components in the order scheduling system component of FIG. 2.

In the order scheduling system 200, areas, skills, window hierarchies, and booking patterns are used to provide flexibility when booking appointments and when assigning FSR resources to a booked appointment. FIG. 3 is a diagram illustrating various relationships among system table 208 elements in the OSS component 202 of FIG. 2. As shown in FIG. 3, with the system 200 the company's service area is divided into a number of OSS "areas". Each FSR is assigned to an area, and can only work within that area on jobs requiring that FSR's skill. Each area is assigned a number of skills and a set of appointment windows that can be offered to customers for work requiring each of those skills. Since different areas can have different characteristics for the purpose of booking appointments (e.g., a large remote area that is visited by a single FSR only once a week, or a busy metropolitan area to which a large number of FSRs are assigned), the OSS component 202 can be configured differently for each area. Most notably, for each defined area, the company can specify which FSRs are assigned to the area on any given day, what skill codes (resource codes) are supported within the area, and what specific appointment "windows" can be offered to a customer within the area. An appointment window is a bound on time or interval during which an FSR can arrive at the site to perform the requested service. The set of available appointment windows can be different for different skills. For example, fairly large appointment windows may be appropriate for a highly skilled (and expensive) FSR, so that the company has considerable flexibility in assigning that FSR's appointments. On the other hand, smaller appointment windows may be appropriate for less skilled work that can be done by a number of different FSRs.

FIG. 3 depicts an Area 2 having four skills: Skills 1 and 2 are associated with a Window Hierarchy 1, while Skills 3 and 4 are associated with a Window Hierarchy 2. A Window Hierarchy is a set of appointment windows that is grouped to form the window hierarchy, as will be described in more detail below with reference to FIG. 4. In the example of FIG. 3, three FSRs are assigned to Area 2: FSRs 1 and 3 with Skill 2, and FSR 2 with Skill 3. Assuming each FSR works for 8 hours on any given day, the OSS component 202 has the following pools of time available for booking appointments: 16 hours of Skill 2 and 8 hours of Skill 3. If a work order for Area 2 requires Skill 2, then the OSS component 202 must book the appointment in one of the windows offered by Window Hierarchy 1 and, when combined with other appointments booked for Skill 2, the OSS component must ensure demand for Skill 2 does not require more than 16 hours of work and travel time on the appointment day. Similarly, if an order for Area 2 requires Skill 3, the OSS component 202 books the appointment in one of the windows offered by Window Hierarchy 2 and, when combined with other appointments booked for Skill 3, ensures the demand for Skill 3 does not require more than 8 hours of work and travel time on the appointment day. In the example of FIG. 3, no orders requiring Skills 1 or 4 can be booked for Area 2 because no FSRs with those skills are assigned to the area. The OSS component 202 also keeps track of the total amount of time (pooled, for all FSRs) that is available for work on customer appointments in each area, based on skill and the time window in which the work is to be done. This information is derived from FSR-shift assignments.

Figure 4:
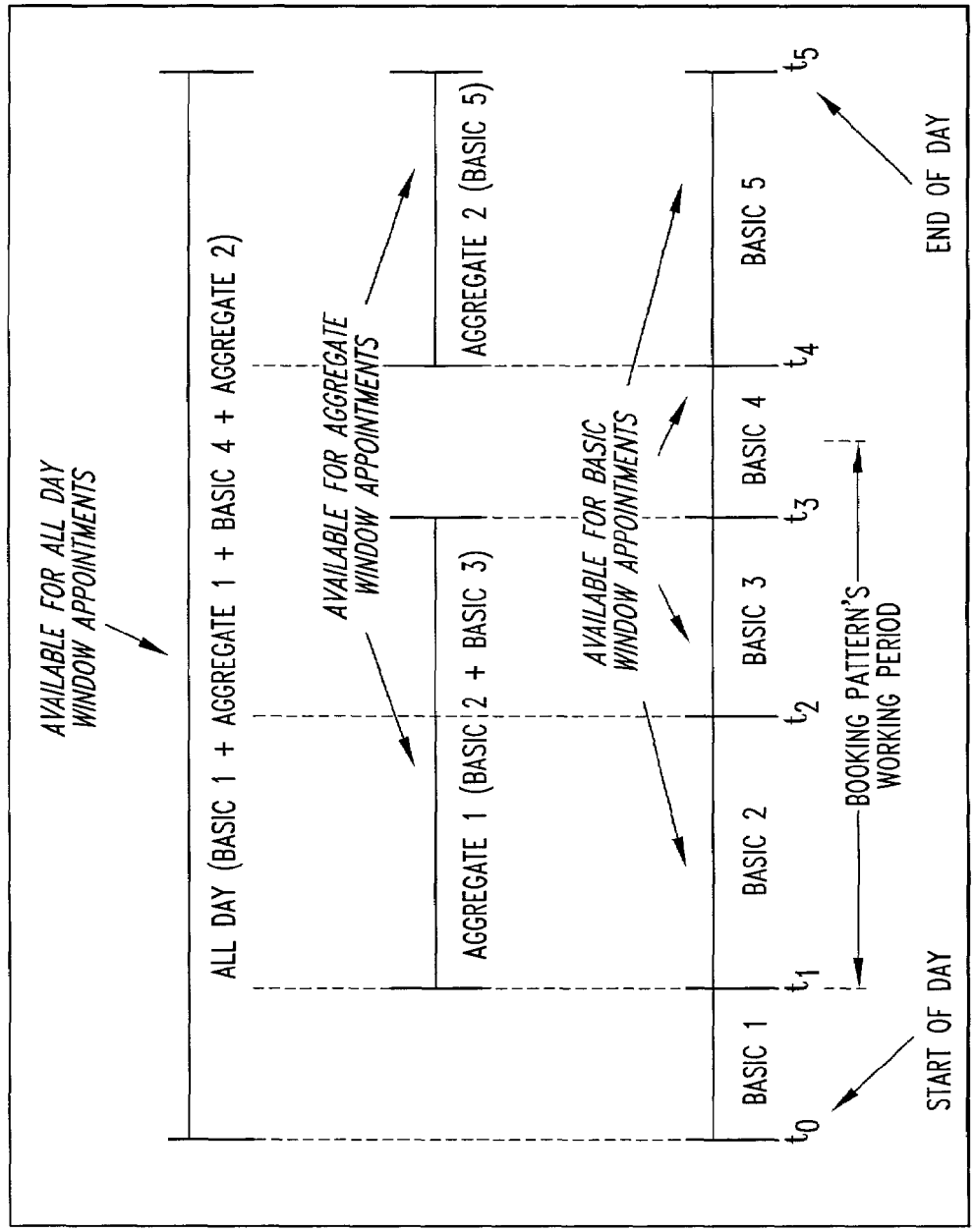
FIG. 4 is a diagram illustrating an example window hierarchy system table component in the order scheduling system component of FIG. 2.

FIG. 4 illustrates a sample Window Heirarchy, and shows that each window hierarchy consists of three levels of appointment windows: an all day appointment window (e.g., from 8 a.m. to 6 p.m.), aggregate appointment windows (e.g., the morning or afternoon), and basic window appointments (e.g., 9 a.m. to 11 a.m., or 1 p.m. to 2 p.m.). As previously described, a Window Hierarchy is a set of appointment windows that is grouped to form the window hierarchy. Typically, a Customer Service Representative (CSR) first offers a customer 206 (FIG. 2) an all day appointment, and if the appointment is not acceptable, the CSR offers an aggregate window appointment, and then finally a basic window appointment. The CSRs schedule appointments in these windows based on the pool of FSR resources expected to be available in that time frame. The basic building blocks of the Window Hierarchy are a set of contiguous basic windows that span the working day. Subsets of these basic windows are grouped into larger aggregate windows. The aggregate windows and any basic windows not belonging to an aggregate window are grouped into an all day window. The Window Hierarchy in FIG. 4 indicates that work for an all day window appointment can be started at any time between t0 and t5. Work for an aggregate window appointment, such as Aggregate 1, can be started at any time between t1 and t3. Work for a basic window appointment, such as Basic 4, can be started at any time between t3 and t4.

The OSS component 202 provides the CSRs with the ability to schedule splittable orders which, as previously described, allow the client to more efficiently utilize its resources. Recall, a splittable order is an order taking more than one day to complete. Each splittable order has an associated "split time" which is less than the job duration for the order. When booking a splittable order, the OSS component 202 books only the split time and the travel time on the appointment day. The balance of the time to complete the splittable order (that is, the remaining work time plus further travel time) can be booked on subsequent days. Orders that take no more than one day to complete are called "non-splittable orders". When booking a non-splittable order, the OSS component 202 schedules the entire job duration and travel time on the appointment day.

The system tables 208 further include booking patterns that specify the days on which work can be performed. When booking appointments, the OSS component 202 books time only on these "working days". Hence, for both splittable and non-splittable orders, if a booking pattern is specified, the appointment day must be a working day. For splittable orders, when time is booked on days subsequent to the appointment day, it is only booked on working days. For example, a booking pattern might consist of five working days (Monday to Friday) followed by two non-working days (Saturday and Sunday). With that booking pattern, an appointment for a splittable order might have an appointment day of Monday and have further time booked on Tuesday, Wednesday and Thursday, or it might have an appointment day of Thursday and have further time booked on Friday, Monday and Tuesday.

Booking patterns also specify the daily period during which work can be performed. Time is only booked into windows that overlap with this working period. Therefore, for both splittable and non-splittable orders, if a booking pattern is specified: the appointment window must overlap with the working period; time is booked into the appointment window and subsequent windows of the same type that overlap with the working period. For splittable orders, when time is booked on days subsequent to the appointment day, it is booked into the earliest window that overlaps with the working period and subsequent windows of the same type that overlap with the working period. For example, consider the window hierarchy in FIG. 4. If a booking pattern's working period starts at time t1 and ends at time t3.5 (that is, between times t3 and t4) and a basic window appointment for a splittable order is to be booked into window Basic 3: on the appointment day, time is booked into Basic 3 and Basic 4. On days subsequent to the appointment day, time is booked into windows Basic 2, Basic 3, and Basic 4. When a window partially overlaps a working period of a booking pattern (as for window Basic 4 in the above example), the amount of time booked in the window is proportional to the overlap between the window and the working period. When a booking pattern is not specified (for non-splittable orders), time is booked into the appointment window and all subsequent windows of the same type. For example, again consider the window hierarchy in FIG. 4. If a basic window appointment is to be booked into the window Basic 3, time is booked into the windows Basic 3, Basic 4, and Basic 5.

The OSS component 202 does not assign specific FSRs to appointment orders, but instead simply determines if sufficient resources will be available to complete all of the orders that are booked for any given day. Later, once all of the orders for a given day are booked, the utility, telecommunications, or field service company (i.e., the client) can assign a specific FSR to perform each appointment order based on the actual resources available on that day, and on any other company-specific factors. This allows the company to optimize the way in which appointment orders are staffed and, at the same time, to plan appointments into the future.

In the following description, bold typeface identifies data items that are defined in a "Data Dictionary" section included towards the end of the detailed description section.

The operational role of the System Administrator in the system 200 will now be described in more detail. The System Administrator has the capability of Adding, Modifying, or Terminating a entries in the system table 208. The OSS component 202 allows a user (i.e., the System Administrator) to add, modify, terminate, and reactivate entries in a number of system tables 208. The component 202 ensures that all validation rules (as listed below and in the "Data Dictionary") are followed, and that interrelationships between entries in different tables are maintained (e.g., a skill cannot be associated with a window hierarchy unless the window hierarchy already exists). However, the operational impact of changes which adhere to these validation rules is considered the responsibility of the user (e.g., a change in FSR resources that can turn a previously underbooked window into an overbooked window). The OSS component 202 "terminates" system table 208 entries rather than deleting them. In this way, table entries remain in the system and can be referenced; terminated table entries cannot be used to create further references to other table entries. For example, appointments can still be booked against windows in a terminated window hierarchy; however, a terminated window hierarchy cannot be given a new association with a skill. Terminated table 208 entries can be reactivated. Both the System Administrator and Manager have access to table management functions of the OSS component 202. The System Administrator access is intended for the one-time initial set-up of the system configuration while Manager access is intended for the maintenance of the system configuration of the component 202.

The OSS component 202 provides the capability to add, modify, terminate, and reactivate system table 208 entries on request from the System Administrator and Manager. The changes shall become effective as described below regarding "Activate System Table and FSR-Shift Changes". Terminated table entries cannot be modified; they can be reactivated and then modified. The information the System Administrator and Manager input to the system tables 208 is as set forth in the following paragraphs.

The OSS component 202 provides the capability to define the identifier for the skill code, define the description of the skill code, and define two parameters which apply to all FSRs with this skill code. These parameters are: 1) the percentage of the FSR's time to be associated with dated orders. Dated orders must be completed on the specified date, and as such are processed by OSS component 202; and 2) the percentage of the FSR's time to be associated with undated orders. Undated orders can be completed on any date, and as such are not processed by OSS component 202. These orders are completed when it is convenient for the company (typically when an FSR is at the site for another reason). The combined value of these parameters can exceed 100 percent. These parameters, along with similar ones for FSRs, are used in conjunction with the requirements in the section regarding "Set Availability Parameters", to define how FSR availability is determined.

The OSS component 202 provides the capability to define the identifier for the job code, define the description of the job code, define the average time to complete the work, excluding travel, and define one or more skill codes that can be used to complete the work associated with the job code. If more than one skill code is defined, the skill codes will be prioritized so that the first skill code is the most desirable skill to use for the order, the second skill code is the next most desirable skill to use for the order, and so forth. The OSS component 202 ensures that a skill code cannot be associated with a job code if the skill code has been terminated.

The OSS component 202 provides the capability to define the user identifiers, define the user name, define the user password, and define the user class. The user class shall be either System Administrator or Manager. (Notes: Neither FSR nor OSS Client is a user class in the OSS component 202. FSR-shift assignments are used by OSS component 202 to determine resource availability, but FSRs themselves do not log into OSS component 202 or use OSS component 202 functionality. As external systems, Clients 204 are configured when the OSS component 202 is installed; Clients 204 are responsible for managing CSR sessions and CSR access control, but they do not log into the OSS component 202.

The OSS component 202 defines the user privileges, with the following privileges being either granted or denied to a user. The privilege to Add, Modify, Terminate, and Reactivate Skill Codes, Job Codes, Users, FSRs, Areas, Window Hierarchies, and Booking Patterns, to set availability parameters as described in the section on "Set Availability Parameters" below, to re-build the work schedule, as described in the section "Activate System Table and FSR-Shift Assignments" below, to backup the OSS component 202 application and manage peripheral processes, as described in the section "Maintain the OSS component 202 Server" below, and to modify User privileges. A user with this privilege can modify the privileges of himself or another user.

The OSS component 202 provides the capability to define the identifier for the FSR, define the name of the FSR, define the home area of the FSR for the purposes of OSS component 202 processing. (Note: This can differ from the home area used in Advantex.), define a single skill code for the FSR. (Note: This skill code is the same as the primary skill code used in Advantex.). The OSS component 202 ensures that a skill code cannot be associated with an FSR if the skill code has been terminated. In the FSR table, the user can exclude the FSR from OSS component 202 processing. The FSR can still be assigned to a shift but the FSR's time will not be available for booking appointments. The user can define the percentage of the FSR's time to be associated with dated orders and define the percentage of the FSR's time to be associated with undated orders. The combined value of the last two parameters can exceed 100 percent. These parameters, along with similar ones for skills, are used in conjunction with the requirements in the section "Set Availability Parameters" below, to define how FSR availability is determined. A terminated FSR is not considered for OSS component 202 processing.

The OSS component 202 provides the capability of defining the identifier for the shift, and defining the shift. A shift spans one or more contiguous calendar days (always starting at 00:00 on the first day and ending at 24:00 on the last day) and includes zero or more working periods, which are defined in terms of: 1) a start and end time with start and end times need not be on the same calendar day, and can be different for each working period within a shift; and 2) the start and end times of up to three breaks contained within the working period. The working periods associated with a shift must be entirely contained within that shift (that is, they cannot start within the shift and end outside the shift). Working periods cannot overlap. The OSS component 202 can exclude the shift and all resources (FSRs) associated with it from processing in which case the shift can still be assigned to an FSR but the resources will not be available for booking appointments. The time spent by an FSR on a terminated shift is not considered for OSS component 202 processing.

The OSS component 202 provides the capability to define the identifier for the area, define the description of the area, define the average time to travel to an appointment within the area, and define the number of days into the future that appointment bookings can be made against the area (including the current day). For example, if this parameter is set to ten days, bookings can be made for the current day and any of the following nine days. This restriction applies to aggregate and basic window appointments. All day window appointments can be booked beyond this time but only with an override (see the section regarding "Book a New Appointment with an Override"). The component 202 ensures that if the number of days into the future that appointment bookings can be made for an area is a value, n, then this number can only be reduced to a new value, m, if all previously booked appointments are scheduled for the current day, or one of the following m−1 days (i.e., no previously booked appointments are scheduled for the following m to n−1 days). This ensures that all previously booked appointments are still accessible (i.e., can still be changed or canceled) by the OSS component 202 Client. This restriction does not apply to appointments booked beyond the current limit with an override (see the section regarding "Book a New Appointment with an Override"). For example, if the number of days for bookings is set to 20 days (allowing bookings for up to 19 days from now) and the most future appointment has been booked for 10 days from today, the number of days for bookings cannot be reduced to less than 11 days.

The number of days into the future that bookings can be made for an area can be increased provided it does not exceed the limit imposed as part of configuration. No other restrictions apply. For an appointment to be completed on the same day as it is booked, define the cut-off time for booking appointments and how soon after booking the appointment work can be scheduled to begin. Also define the skills and associated window hierarchies that are to be used for the area for today and for each date in the future. A skill/window hierarchy definition determines which set of appointment windows can be used to book appointments for a skill for the area. Skills can be added and removed over time; different window hierarchies can be associated with the same skill on different dates. For example, on day 10, the area could be using two skills: SK01 with window hierarchy WH01 and SK02 with a window hierarchy WH02. On day 15, SK02 (and by association WH02) could be removed from the area. On day 20, the window hierarchy associated with SK01 could be changed to WH02. An area need not have any skills. If the number of days into the future that bookings are allowed for the area is a value, n, then the system shall ensure that the skill/window hierarchy associations in effect for area for today and the next n−1 days cannot be changed (that is, existing associations cannot be modified or deleted and new associations cannot be added). Skill/window hierarchy associations in effect for the area on day n and beyond can be changed (that is, existing associations can be modified or deleted and new associations can be added).

A skill/window hierarchy association cannot be added to an area if either the skill or window hierarchy is terminated. The window hierarchy associated with a skill can be changed even if the skill is terminated, provided the new window hierarchy is not terminated. A window hierarchy can only be associated with a skill if the window hierarchy has windows defined for the day on which its association is to take effect (a window hierarchy can be defined without having windows defined). Skill/window hierarchy associations are added and deleted; they are not terminated and reactivated.

The component 202 provides the capability to define the identifier for the window hierarchy, define the description of the window hierarchy, define the window definitions that are to be used for the window hierarchy for today and for each date in the future. For example, a window hierarchy, WH01, might not have any windows defined until day 10; on day 20 the windows definitions for WH01 might change from those defined on day 10. A window hierarchy need not have windows defined on the date that it is added; however, a window hierarchy must have windows defined for at least one date and all dates thereafter. Window definitions can be modified. If a window hierarchy has any windows defined on a given date, then it must have all the following (and only the following) windows defined on that date: 1) a single large window (defined by start and end times) that is available for "all day window" appointments. The all day window cannot start before 00:00 in morning or end before 24:00 in the evening; 2) a set of the smaller windows (defined by start and end times) that are available for "basic window" appointments. This set must be defined such that the start time of the first window is not earlier than the start time of the all day window (it can be later), the end time of the last window is not later than the end time of the all day window (it can be earlier), the windows are contiguous (that is, there cannot be gaps between the windows and they cannot overlap), and up to three non-overlapping aggregations of the basic windows (defined by start and end times) that are available for "aggregate window appointments". These are usually referred to as AM, PM, and evening (EV) appointment types.

Since these windows are aggregations of basic windows, each must be defined such tha the start time corresponds to the start time of a basic window, the end time corresponds to the end time of a basic window, aggregate windows need not be contiguous (that is, there can be a gap between two aggregate windows). Aggregate windows cannot overlap, the system shall ensure that if a window hierarchy is associated with one or more areas, then the definition of the windows in that window hierarchy cannot be changed until after the most future date for which bookings can be made for the areas. This restriction prevents the window hierarchy infrastructure from changing for appointments that might previously be booked.

More precisely, if $n_i$=the number of days into the future that bookings are allowed for area$_i$, N=maximum ($n_i$), taken over all areas such that the window hierarchy is associated with a skill in area$_i$ for today or any of the next $n_i$ days, then the system shall ensure that the window definitions in effect for the window hierarchy for today and the next N−1 days cannot be modified. Window definitions in effect for the window hierarchy on day N and beyond can be modified.

For example, if Today is day 0, Bookings are allowed for three areas as follows: A1: up to 12 days, A2: up to 15 days, A3: up to 9 days. A window hierarchy is used in A1 on day 4 only, in A3 on days 0 to 8, and not in A2, then a change to the definition of the windows in the window hierarchy cannot occur before day 13. If a window hierarchy is not associated with an area, modifications to the window definitions can take effect on or after the current day.

The OSS component 202 provides the capability to define the identifier for the booking pattern, define the description of the booking pattern, define the number of "days on" for the booking pattern. This number must be greater than or equal to one, define the number of "days off" for the booking pattern. This number must be greater than or equal to zero, define the anchor date for the booking pattern. A booking pattern comprises a number of working days (as specified by "days on") followed by a number of non-working days (as specified by "days off"). The anchor date fixes the first day of the booking pattern and the specified pattern repeats every (days on+days off) days. For example, with an anchor date of today, 3 days on, and 1 day off: today, today+1, today+2, and today+4 are working days; yesterday and today+3 are non-working days.

When a booking pattern is specified as part of an appointment request, the system will only book time on working days. The user also defines the start time of the booking pattern and the end time of the booking pattern. The start time and end time of the booking pattern specify the daily period during which work can be performed. When a booking pattern is specified as part of an appointment request, the system will only book time into windows that overlap with this (working) period.

The System Administrator and Manager shall have the ability to add, modify, terminate, and reactivate entries from the skill code, job code, user, FSR, shift, booking pattern, window hierarchy and area tables, provided they have privileges to do so. The System Administrator also has the capability of defining the Field Service Representative Availability.

The OSS component 202 allows users to define resource availability by adding, modifying, or deleting the assignment of FSRs to shifts. These assignments can take the form of shift rotations, in which one or more shifts previously assigned to an FSR is repeated for an indefinite period. For example, assume that a shift is defined as 08:00 to 17:00 on any given day. If an FSR is assigned to that shift for six consecutive days and then has two days off, an eight day rotation can be defined where, on a continuing basis, the FSR works from 08:00 to 17:00 for six days and then has two days off.

The associate specific FSRs with specific shifts, and to modify or delete existing associations, on request from the Manager. The changes shall take effect as described in section 2.4, "Activate System Table and FSR-Shift Changes". The OSS component 202 provides the capability todefine a shift rotation for an individual FSR. A shift rotation is the assignment of an FSR to an indefinitely repeating set of shifts which are previously assigned to that FSR. The OSS component 202 provides the capability to override the home OSS area for an FSR for specific shifts. The OSS component 202 provides the capability to define specific dates for which no work is performed on any shift (e.g., statutory or company holidays). If any part of a working period falls on one of these days, the entire working period is excluded from assignment to FSRs. The OSS component 202 provides the capability to override shift assignments by allowing the user to: 1) exclude selected portions of working periods that are assigned to an FSR from availability calculations; and 2) include selected portions of time that are not assigned to an FSR in availability calculations (i.e., working periods that are not actually part of a defined shift). The Manager shall have the capability to add, modify, or delete assignments of FSRs to shifts.

The OSS component 202 allows the user to select the method for determining FSR availability. Availability is calculated as the percentage of an FSR's time that is assigned to shifts and that can be used for dated orders. This value is associated with either a global parameter (in which case a single value is applied to all FSRs), with the FSR's skill (in which case a single value is applied to all FSRs with that skill), or with individual FSRs (in which case the value can vary from FSR to FSR). The percentage value may be associated globally with all FSRs. The percentage value may be associated with the FSR's skill code or the percentage value may be associated with the individual FSR. The selected method shall apply to all FSRs.

The OSS component 202 provides the capability to limit the availability of all FSRs to 100 percent of the time associated with their shifts. If this capability is selected and if the percentage of time associated with dated orders plus the percentage of time associated with undated orders exceeds 100 percent, then the percentage of time associated with dated orders shall be taken as: (% time for dated orders)/(% time for undated orders+% time for dated orders). This "prorating" shall apply either globally, or at the skill code or FSR level, depending on the method that is selected for determining availability. The System Administrator and Manager shall have the ability to set availability parameters, provided they have privileges to do so.

The OSS component 202 activates the changes to system tables 208 and FSR-Shift assignments in three ways: changes to some system tables are activated immediately, while changes to other system tables and the FSR-Shift assignments are activated either automatically on the next calendar day, or on request from the user. When changes are activated, the new data becomes "visible" to the system and is then used in determining resource availability and booking appointments. The OSS component 202 also allows the user to exclude appointment bookings for specific windows within an area. The exclusion must specify the skill(s) and date range that are to be excluded.

The OSS component 202 activates previously defined changes to system tables 208 and FSR-Shift assignments, both automatically and on request from the System Administrator and Manager. The system shall activate system table and FSR-Shift assignment changes as follows. First, all skill code, job code, booking pattern, and user additions, modifications, terminations, and reactivations shall be immediately active. The component 202 uses the new skill code, job code and booking pattern information when booking subsequent appointments. OSS uses the new user information when providing access to the system during subsequent logons. Second, all FSR and shift additions, modifications, terminations, and reactivations, and all FSR-Shift assignment additions, modifications, and deletions shall become active for a specific area when the work schedule is re-built for that area (see below). When the work schedule is re-built for an area, OSS uses the new FSR, shift, and FSR-Shift assignment information to determine resource availability for booking subsequent appointments to that area (based on the conceptual algorithm given in Appendix A, "Determining Resource Availability"). Finally, all area terminations and all modifications to the area travel time and same day booking parameters shall become immediately active. The OSS component 202 uses the new area information when booking subsequent appointments. All other modifications to areas, additions and reactivations of areas, and all additions and modifications to window hierarchies shall become active for a specific area when the work schedule is re-built for that area (see below). When the work schedule is re-built for an area, OSS uses the new area and window hierarchy information for booking subsequent appointments to that area. (Note: It might be possible for the OSS Client 204 to book appointments for a reactivated area prior to re-building the work schedule, although this is not guaranteed.)

The work schedule is re-built for an area as follows. On request from the System Administrator and Manager, for a specified area and date range. The start date shall be on or after the current date; the end date shall be on or before the most future date for which appointment bookings can be made for the area. Changes are only activated for the dates selected. Alternatively, the schedule may be re-built automatically, for all areas, for the current date and all future dates for which appointment bookings can be made for those areas. The activation shall occur at a configurable time of day. Changes are activated for all dates for which appointments can be booked. Activation should be set to occur early in the day, before any appointments are likely to be booked. Terminations and reactivations of window hierarchies do not affect the booking of appointments by OSS component 202.

The OSS component 202 excludes selected all day, aggregate, and basic windows from appointment bookings for a specific area, skill code, and date, on request from the System Administrator and Manager. The selected windows and skill code must be defined for the area on the selected date. The selected date must have been built for the area. (Note: The time contributed to the resource pool for the excluded window can be used by other related windows, even though booking is prohibited in the excluded window. For example, assume that a single FSR belongs to a window hierarchy that contains two one hour basic windows, Basic 1 and Basic 2, and one two hour aggregate window, Aggregate 1, made up of Basic 1 and Basic 2. If Basic 1 is excluded, then no work can be booked in Basic 1, one hour of work can be booked in Basic 2, and two hours of work can be booked in Aggregate 1; the exclusion of the subordinate Basic 1 window has no effect on the amount of time that can be booked in Aggregate 1.) The System Administrator and Manager have the ability to rebuild the work schedule and to determine the time at which the system re-builds the work schedule automatically.

The OSS component 202 allows CSRs to review appointment availability and book appointments via the client 204. A typical scenario for booking an appointment is as follows. The CSR requests an appointment in a specific appointment window on a given day. The OSS component 202 validates the request against a number of booking constraints (e.g., appointments cannot be booked too late in the day) and against projected Field Service Representative (FSR) resources for that appointment window. If the request does not violate any booking constraints and does not result in an overbooking, then OSS books the appointment and advises the OSS Client of the booking details. If the OSS component 202 cannot book the appointment for any reason, it provides the CSR with a set of alternate appointment windows in which the original request can be booked. The component 202 informs the CSR of the reason for not booking the appointment and, if it is the result of resource availability, OSS provides the CSR with an indication of the degree to which the requested window is overbooked. The CSR books one of the alternate appointment windows, or forces the booking to the originally requested window through an override capability. Alternatively, the CSR can request a list of appointment windows which the OSS component 202 has verified are available and books one of the available windows, or forces the booking to a window that is not in the list provided by OSS. The OSS component 202 allows appointments to be booked for current and future days. Orders processed by OSS must be dated.

The OSS Client 204 has the capability to: 1) book a New Appointment; 2) book a New Appointment with an Override; 3) modify a Booked Appointment; 4) cancel an Appointment; and 5) request a List of Available Appointments, each of which will now be described in more detail. When a booking request is received from the OSS Client 204, the OSS component 202 verifies that the request does not violate any booking constraints (e.g., the appointment cannot be booked too late in the day) and that sufficient projected FSR resources are available. If the request can be booked, the OSS component 202 books the appointment, "reserves" the required resources, and notifies the OSS Client 204 of both the appointment time window and the time required to perform the work. If the request cannot be booked for any reason, the OSS component 202 attempts to provide the OSS Client 204 with a set of alternate appointment windows. Alternate appointment windows are those into which the appointment can be booked without an override, that is, those that do not violate any booking constraints and that have sufficient resources to perform the work.

The OSS component 202 shall book a new appointment on receipt of an appointment request from the OSS Client 204. Upon receipt of an appointment request from the OSS Client 204, if the appointment override flag is not set, the OSS component 202 validates the appointment request for booking processing. The OSS component 202 considers the appointment request valid for booking if all of the following are satisfied. The appointment type, area, and job code are known to the system and the area and job code are not terminated and the requested date is for the current day or later. If the appointment type is for a basic window, the requested time is specified; otherwise, no time is specified. If the appointment type is for a basic window, the requested time falls within one of the basic windows associated with the area. This window is hereafter referred to as the "requested window", along with the windows implied by the aggregate and all day window appointment types. Also, the requested date cannot be too far into the future for the area. If a split time is specified, then if a job duration override is specified, the split time is less than the job duration override, and otherwise, the split time is less than the duration of the job code. If a booking pattern is specified, the booking pattern must be known to the system and is not terminated and the requested date is a working day for the booking pattern. The requested window overlaps with the working period defined by the booking pattern's start and end times. At least one of the skill codes needed for the requested job code is defined for the area on the requested date, and that skill code is not terminated. In addition, the requested window must not be excluded from processing by the OSS component 202. If the requested date is for the current day then the end time of the requested window is later than the current time by the minimum time required for the associated area and the current time is not later than the booking cut-off time for the associated area.

Sufficient service resources must exist to perform the requested work. Sufficient resources exist if there is a skill code and associated window hierarchy defined for the requested area that contains windows for the requested appointment type into which the appointment request can be booked, and which have sufficient time available to perform the work. The system shall attempt to book the appointment based on decreasing order of priority of the skill codes associated with the job code. The appointment is booked into the requested window and subsequent windows of the same type (that is, if the requested window is an all day window, the appointment is booked into the requested window and subsequent all day windows; if the requested window is an AM, PM, or EV window, the appointment is booked into the requested window and subsequent AM, PM, and EV windows; if the requested window is a basic window, the appointment is booked into the requested window and subsequent basic windows), provided the windows are not excluded from OSS processing. If a split time is not specified, the entire time to perform the work must be booked on the requested date, where the time to perform the work is taken as the travel time for the area plus either the job duration override (if specified) or the duration for the job code. Otherwise, the travel time for the area plus the split time is booked on the requested date, and the balance of the time to perform the work (including further travel time) is booked on subsequent days. If a booking pattern is specified, time is only booked into windows that overlap with the working period defined by the booking pattern's start and end times on working days for the booking pattern.

If the system considers the appointment request valid for booking, the OSS component 202 assigns a unique appointment identifier to the appointment, and transmit a booked appointment to the OSS Client 204, stores the appointment log for the approved appointment request, increases, by the appropriate amount, the time used for appointments in the time windows used by the booked appointment. If the OSS component 202 does not consider the appointment request valid for booking, the component transmit an error message to the OSS Client 204 which indicates failure to book the appointment and the reason for the failure, and stores the appointment log for the rejected appointment request. If the OSS component 202 does not consider the appointment request valid for booking, and if the reason for considering the appointment request invalid is that sufficient resources do not exist to perform the work, the OSS component 202 transmits rejected appointment information to the OSS Client 204. The rejected appointment information shall be for the window that caused the overbooking. For example, if a booking to a basic window results in the overbooking of an AM window, the information returned will be for the AM window. If more than one skill code is associated with the job code and all related windows result in an overbooking, the rejected appointment information shall be for the highest priority skill code.

If the OSS component 202 does not consider the appointment request valid for booking, and if the reason for considering the appointment request invalid is one of the following: 1) the requested window is excluded from OSS processing; 2) if the requested date is for the current day, the end time of the requested window is later than the current time by the minimum time required for the associated area and the current time is not later than the cut-off time for the associated area; 3) the booking pattern is specified and the requested date is not a working day for the booking pattern; and 4) sufficient resources do not exist to perform the work. In this situation, the OSS component 202 transmits a set of from zero to fourteen alternate appointment times to the OSS Client 204, where the alternate appointment times are determined as follows. First, the appointment type shall be the same as the requested appointment type. Second, the appointment dates shall be on or after the requested date. If the appointment type is for a basic window, the appointment times shall only be for the basic window within which the specified time falls. For example, if the basic windows are 08:00-09:00, 09:00-10:00, 10:00-11:00, . . . , and a time of 8:30 is specified, alternate windows would only include the 08:00-09:00 basic window. The next available times shall be determined based on the conceptual algorithm set forth below for "Determining Resource Availability". The times are ordered chronologically, and shall not include times where the requested date is too far into the future for the associated area, the requested window is excluded from processing by the OSS component 202, and sufficient resources do not exist to perform the work. The OSS Client 204 shall have the ability to make new appointment requests.

When a booking request with an override flag is received from the OSS Client 204, the OSS component 202 books the appointment, "reserves" the required resources, and notifies the OSS Client of the appointment time window and the time required to perform the work. The OSS component 202 does not check booking constraints, check whether windows are excluded from processing, or prevent overbooking for appointments booked with an override flag. Appointments can be booked with the override flag even if they have not previously been rejected by the OSS component.

The OSS component 202 books an appointment on receipt of an appointment request, even if the appointment results in an overbooking, or in the use of a time window that is excluded from booking for the associated area. Upon receipt of an appointment request from the OSS Client 204, if the appointment override flag is set, the OSS component 202 validates the appointment request for booking processing. The OSS component 202 considers the appointment request to be valid for booking if all of the following are satisfied. First, if the appointment type, area, and job code are known to the OSS component. Second, if the area and job code are not terminated. Third, if the requested date is for the current day or later. Fourth, if the appointment type is for a basic window, the requested time is specified; otherwise, no time is specified. Fifth, if the appointment type is for a basic window, the requested time falls within one of the basic windows associated with the area. This window is hereafter referred to as the "requested window", along with the windows implied by the aggregate and all day window appointment types. Sixth, if the appointment type is for an aggregate or basic window, the requested date is not too far into the future for the area (i.e., only all day appointments can override this restriction). Seventh, if a split time is specified and if a job duration override is specified, the split time is less than the job duration override; otherwise, the split time is less than the duration of the job code. If a booking pattern is specified, the booking pattern must be configured in the OSS component 202 and must not be terminated. The requested date must be a working day for the booking pattern, and the requested window overlaps with the working period defined by the booking pattern's start and end times. Eighth, at least one of the skill codes needed for the requested job code is defined for the area on the requested date, and that skill code is not terminated. There is a skill code and associated window hierarchy defined for the requested area that contains windows for the requested appointment type into which the appointment request can be booked.

The OSS component 202 books the appointment into the requested window and subsequent windows of the same type (that is, if the requested window is an all day window, the appointment is booked into the requested window and subsequent all day windows; if the requested window is an AM, PM, or EV window, the appointment is booked into the requested window and subsequent AM, PM, and EV windows; if the requested window is a basic window, the appointment is booked into the requested window and subsequent basic windows), including windows which are excluded from OSS processing. If a split time is not specified, the entire time to perform the work must be booked on the requested date, where the time to perform the work is taken as the travel time for the area plus either the job duration override (if specified) or the duration of the job code. Otherwise, the travel time for the area plus the split time is booked on the requested date, and the balance of the time to perform the work (including further travel time) is booked on subsequent days. If a booking pattern is specified, time is only booked into windows that overlap with the working period defined by the booking pattern's start and end times on working days for the booking pattern.

The override capability of the system 200 has the effect of booking appointments which, if processed previously described for booking a new appointment cannot be booked because at least one of the following is true. Sufficient resources do not exist to perform the work (time must be booked into windows which do not have sufficient time available); the appointment is for an all day window and is too far into the future for the associated area; the appointment is for the current day and is booked too late in day; the appointment is for the current day and work is to begin too soon from the time of booking; or the requested window is excluded from processing. If the OSS component 202 considers the appointment request valid for booking, the component assigns a unique appointment identifier to the appointment, and transmits a booked appointment to the OSS Client 204. Increase, by the appropriate amount, the time used for appointments in the time windows used by the booked appointment. If more than one skill code associated with the job code can be used to book the appointment with an override, the appointment shall be booked using the highest priority skill code. The OSS component 202 stores the appointment log for the override appointment request. If the OSS component 202 does not consider the appointment request valid for booking, the component transmits an error message to the OSS Client 204 which indicates failure to book the appointment and the reason for the failure and stores the appointment log for the rejected appointment request. The OSS Client 204 has the ability to make new appointment requests with overrides.

The OSS component 202 allows the user to change a previously booked appointment. Appointments can be changed in every respect except for area. When an appointment is changed, it is processed as if it is an entirely new appointment request, either with or without an override flag. The new appointment request is then booked and the old appointment is tagged as canceled. The OSS component 202 modifies a previously booked appointment when an appointment change request is received from the OSS Client 204. If the OSS component 202 receives an appointment change request from the OSS Client 204, the component verifies that the old booked appointment specified in the appointment change request exists and has not been canceled, and that the appointment date and time have not passed (i.e., either the appointment is for a future date, or the appointment is for the current date and the start time of the window is later than the current time). If the old booked appointment does not exist or if the appointment date and time have passed, the OSS client 202 transmits an error message to the OSS Client 204. If the old booked appointment exists and has not been canceled, the appointment date and time have not passed, and the override flag is not set, the OSS client 202 processes the new appointment specified in the appointment change request as described in the section herein on "Booking a New Appointment", with the following provisions. First, the appointment identifier assigned to the appointment shall be different than the appointment identifier for the old appointment, and all booking computations shall assume that the time required for the old booked appointment is free to use. If the new appointment is booked, the old appointment shall be terminated and the time required to complete the work shall be free to use for other appointments. If the old booked appointment exists, the appointment date and time have not passed, and the override flag is set, the OSS client 202 processes the new appointment specified in the appointment change request as described in the section on "Booking a New Appointment with an Override", with the following provision. The appointment identifier assigned to the appointment shall be different than the appointment identifier for the old appointment. If the new appointment is booked, the old appointment shall be terminated and the time required to complete the work shall be free to use for other appointments. The OSS Client 204 can modify a previously booked appointment.

The OSS component 202 allows the user to cancel a previously booked appointment. The OSS component 202 cancels a previously booked appointment on receipt of an appointment cancellation request from the OSS Client 204. If the OSS component 202 receives an appointment cancellation request from the OSS Client 204, the OSS component 202 verifies that the booked appointment specified in the appointment cancellation request exists and that the appointment date and time have not passed (i.e., either the appointment is for a future date, or the appointment is for the current date and the start time of the window is later than the current time). If the booked appointment does not exist or if the appointment date and time have passed, the OSS component 202 transmits an error message to the OSS Client 204. If the booked appointment specified in the appointment cancellation request exists and if the appointment date and time have not passed, the OSS component 202 frees the time required to complete the canceled appointment to use for booking other appointments and transmits a message to the OSS Client 204 confirming the cancellation of the appointment, and cancels the booked appointment in the OSS component 202.

The OSS Client 204 has the ability to a cancel a previously booked appointment. When an appointment list request is received from the OSS Client 204, OSS component 202 attempts to provide the OSS Client with a set of appointment windows into which the original request can be booked. Appointment windows are those into which the appointment can be booked without an override, that is, those that do not violate any booking constraints and that have sufficient resources to perform the work. The OSS component 202 transmits a list of the next most available appointments to the OSS Client 204 on receipt of an appointment list request from the OSS Client. Upon receipt of an appointment list request from the OSS Client 204, the OSS component 202 validates the appointment list request. The OSS component 202 considers the appointment list request valid if all of the following are satisfied. The appointment type, area, and job code are known to the system, the area and job code are not terminated, and if the appointment type is for an AM, PM, EV, or all day window, no time is specified. If a split time is specified, then if a job duration override is specified, the split time is less than the job duration override; otherwise, the split time is less than the duration of the job code. If a booking pattern is specified, it is known to the OSS component 202 and is not terminated, and if the appointment list request is considered valid, the OSS component 202 transmits a set of from zero to fourteen appointment times to the OSS Client 204.

The appointment times are determined as follows. The appointment type shall be the same as the requested appointment type. If the requested date is prior to the current date, the appointment dates shall be on or after the current date; otherwise the appointment dates shall be on or after the requested date. If the booking pattern is specified, then the appointment dates shall be working days for the booking pattern. The appointment times overlap with the working period as defined by the booking pattern's start and end times. If the appointment type is for a basic window and a time is specified, the appointment times shall only be for basic windows within which the specified time falls. If the appointment type is for a basic window and a time is not specified, the appointment times shall be for the next available times for all such windows. The next available times shall be determined based on the conceptual algorithm described herein regarding "Determining Resource Availability." The times shall be ordered chronologically, and shall not include times where: 1) if the requested date is for the current day; 2) the end time of the related appointment window is later than the current time by the minimum time required for the associated area; 3) the current time is not later than the booking cut-off time for the associated area; 4) the requested date is too far into the future for the associated area; 5) the requested window is excluded from OSS component 202 processing; and 6) sufficient resources do not exist to perform the work. If the appointment list request is not considered valid, the system shall transmit an error message to the OSS Client 204 indicating failure to provide a list of appointment times. The OSS Client 204 shall have the ability to make new appointment list requests.

The OSS component 202 allows users to perform a number of system-level functions. These functions provide access control, system start-up/shut-down and backups, and information about system use. The OSS-Client 204 has the capability to Request a Set of Statistics. The Manager and System Administrator have the capability to Access the System and Maintain the OSS Server 210.

The OSS component 202 provides the capability to request statistical information about appointment availability and bookings. Statistics are provided to the OSS Client 204 on a page-by-page basis, where each page contains statistics by skill code, job code, area, and date. For a given job code, area, and date, the user can request statistics for any of the skills associated with the job code. In particular, the user can request a specific skill code, the skill code with the highest priority, the skill code that is one level higher in priority than the last requested skill code, or the skill code that is one level lower in priority to the last request skill code. The OSS component 202 transmits statistics to the OSS Client 204 on receipt of a statistics request from the OSS Client 204. Upon receipt the statistics request from the OSS Client 204, the OSS component 202 validates the statistics request. The OSS component 202 considers the statistics request valid if all of the following are satisfied. First, the area, job code, skill code, and request type are known to the system, and the skill code is associated with both the job code and area. Second, the requested date is for the current day or later. Third, the skill code is present if the request type is for the "current", "previous", or "next" skill code, and not if the request type is for the "first" skill code. If the statistics request is considered valid, the OSS component 202 transmits statistics to the OSS Client 204. The statistics shall be for the requested date and for a skill code associated with the specified job code and area. The skill code is determined as follows. If the request type is "current", the specified skill code shall be used. If the request type is "first", the highest priority skill code shall be used. If the request type is "previous", the skill code that is one level higher in priority than the last requested skill code shall be used. If the request type is "next", the skill code that is one level lower in priority to the last request skill code shall be used. If the statistics request is not considered valid, or if the requested skill code does not exist for the job code or area, the system shall transmit an error message to the OSS Client which indicates failure to provide statistics and the reason. The OSS Client 204 has the ability to make a statistics request.

The OSS component 202 provides system security by controlling user logons and restricting access to functionality based on user class. The OSS component 202 also provides software version number checking between OSS workstations, including clients 204 and managers 226, and the OSS component 202 on the server 210. The OSS component 202 initiates an OSS session on request from the System Administrator or Manager. Upon entry of a user identifier and password, the OSS component 202 validates the user logon. The logon shall be considered valid if the user identifier and password are correct, the logon is initiated from a recognized and valid device, and the version number of the software used by the device is the same as version number used by the OSS component 202. If the logon is consider valid, the OSS component 202 displays the view(s) appropriate to the user's class, and provides the user with access to functionality associated with the user's class and appropriate for the device in use. If the logon in not considered valid, the OSS component 202 displays an error message. The OSS component 202 terminates an OSS session on request from the System Administrator or Manager. Upon entry of a user-initiated request to logoff, the OSS component 202 terminates the user's access to all functionality except the logon dialog. The OSS component 202 displays the logon dialog when the OSS application is started on a device. The System Administrator and Manager shall have the ability to logon or logoff.

The OSS component 202 allows the System Administrator or Manager to maintain the OSS server 210. Maintenance functions include system startup/shutdown, backups, and configuring devices. The OSS component 202 provides System Administrators and Managers with the capability to create a tape backup of the OSS component 202 application and data files, enable peripheral processes (that is, the links to the OSS Clients 204, printers, and other devices connected to the system 200), and disable peripheral processes. The System Administrator and Manager shall have the ability to backup the OSS component 202 and manage peripheral processes, provided they have privileges to do so.

The order scheduling system 200 considers the transitions to and from daylight savings time when it calculates FSR availability. Any scheduled shift time that occurs during the missing time period when a time zone transitions from standard time to daylight savings time is ignored. Any scheduled shift time that occurs during the repeated time period when a time zone transitions from daylight savings time to standard time is repeated. For example, assume there is a window called Basic 1 from 00:00 to 02:00, a window called Basic 2 from 02:00 to 04:00, and one FSR is working from 00:00 to 04:00. If the missing time period is from 02:00 to 03:00, Basic 1 will have two hours of time and Basic 2 will have one hour of time. If the repeated time period is from 01:00 to 02:00, Basic 1 will have three hours of time and Basic 2 will have two hours of time.

The following pseudocode-like description details conceptually one method of how the OSS component 202 can determine resource availability.

For a specific area, skill code, and date (where the skill code is associated with a window hierarchy for the area on that date):
  The time available for booking within a given window:
    =sum, over all FSRs assigned to the area on the given date, who are not themselves excluded from system 200, and who's skill matches the given skill code, of sum, over all shifts to which the FSR is assigned on the given date, and that are not excluded from system 200, of time associated with the shift (excluding non-working periods) that falls within the appointment window x percentage of the FSR's time allocated for dated orders
  The effective window size of a given window:=
    the time available for booking within the window /
    the number of FSRs assigned to the area on the given date, who are not themselves excluded from system 200, who's skill matches the given skill code, and who have a shift on the given date that is not excluded from system 200 and has a working period that overlaps with the appointment window For a given window, if there are no FSRs assigned to the area on the given date, who are not themselves excluded from system 200, who's skill matches the given skill code, and who have a shift on the given date that is not excluded from system 200 and has a working period that overlaps with the appointment window:
  The time available for booking within the given window: =0
  The effective window size of the given window:= the actual size of the appointment window Notes: The percentage of each FSR's time allocated for dated orders is a configurable parameter. This parameter is either a global value that applies to all FSRs, a value that applies to all FSRs with the same skill, or a value for each individual FSR (see section 2.3, "Set Availability Parameters").

The time associated with an excluded window is still available for booking in other related windows. For example, if a two hour a.m. window is made up of two one hour basic windows, one FSR is working, and one of the one hour windows is excluded, the time available in the a.m. window is 120 minutes, not 60 minutes.

Time can be booked to all day, aggregate, and basic windows. Booking to one window may reduce the amount of time available in other related windows. Time can be booked in a window if:
  If the appointment type is for a basic window:
    all time previously booked to the basic window+the time to be booked <=time available to book appointments for the basic window
    and
    all time previously booked to the superordinate aggregate window=all time previously booked to its subordinate basic windows=the time to be booked <=time available to book appointments for the superordinate aggregate window
    and
    all time previously booked to the all day window+all time previously booked to all aggi windows+all time previously booked to all basic windows+the time to be booked <=time available to book appointments for the all day window
  If the appointment type is for an aggregate window:
    all time previously booked to the requested aggregate window+all time previously booked to its subordinate basic windows+the time to be booked <=time available to book appointments for the requested aggregate window
    and
    all time previously booked to the all day window+all time previously booked to all aggi windows+all time previously booked to all basic windows+the time to be booked <=time available to book appointments for the all day window
  If the appointment type is for the all day window:
    all time previously booked to the all day window+all time previously booked to all aggregate windows+all time previously booked to all basic windows+the time to be booked <=time available to book appointments for the all day window When no booking pattern is specified in an appointment request, the appointment is booked as follows:
    If job duration override is specified then:
        Let total work time=(travel time for the area)+(job duration override)
    If job duration override is not specified then:
        Let total work time=(travel time for the area)+(duration of the job)
    Let booking window be requested window.
    Process booking window:
        If total work time>(effective size of booking window) then:
        Attempt to book (effective size of booking window) in booking window.
        If booking succeeds (always true when appointment override flag is set) then:
            Let total work time=(total work time)−(effective size of booking window)
            Let booking window be the next window of the specified type (either all day, aggregate, or basic) for the requested date.
            If such a window exists then:
                Process booking window.
            If no such window exists then:
                Appointment request cannot be booked (failure: not enough available time).
        If booking fails then:
            Appointment request cannot be booked (failure: not enough available time).
    If total work time≦booking window time then:
        Attempt to book (total work time) in booking window.
        If booking succeeds (always true when appointment override flag is set) then:
            Appointment request is fully booked (success).
        If booking fails then:
            Appointment request cannot be booked (failure: not enough available time).
    Notes: This assumes that the requested date is valid, and the requested window is valid on the requested date.
        If appointment override flag is set, consider both non-excluded and excluded windows; otherwise, consider only non-excluded windows.
        If appointment override flag is set, an all day appointment type has been specified, and the requested date is "too far into the future", the effective size of the all day window is taken as the actual size of the all day window.
        Attempting to book 0 minutes to a window always succeeds. (This will occur when the effective size of a window is 0, that is when all working FSRs are on break for the duration of the window.)

When a booking pattern is specified in an appointment request, the appointment is booked as follows:
    Let current day be requested date.
    If job duration override is specified then:
        Let total work time=(travel time for the area)+(job duration override)
    If job duration override is not specified then:
        Let total work time=(travel time for the area)+(duration of the job)
    If split time is specified then:
        Let current day work time=(travel time for the area)+(split time)
    If split time is not specified then:
        Let current day work time=(total work time)
    Process current day:
        If current day is too far into the future for the area (never true when appointment override flag is set and window type is all day) then:
            Appointment request cannot be booked (failure: not enough available time).
    If current day is not requested date and current day is not a working day for booking pattern then:
        Let current day=(current day)+(1 day)
        Process current day.
    If current day is requested date then:
        Let booking window be requested window (for current day).
    If current day is not requested date then:
        Let booking window be the first window of the specified type (either all day, aggregate, or basic) for current day that overlaps with booking pattern.
        If no such window exists then:
            Let current day=(current day)+(1 day)
            Process current day.
    Process booking window:
        If booking window and booking pattern overlap then:
            Let booking window time=(effective size of booking window) x (overlap between booking window and booking pattern)/ (size of booking window)
        If total work time >booking window time then:
            Attempt to book (booking window time) in booking window.
            If booking succeeds (always true when appointment override flag is set) then:
                Let total work time =(total work time)−(booking Window time)
                Let current day work time=(current day work time)−(booking window time)
                Let booking window be the next window of the specified type (either all day, aggregate, or basic) for current day.
                If such a window exists then:
                      Process booking window.
                If no such window exists then:
                      If current day work time>0 then:
                          Appointment request cannot be booked (failure: not enough available time).
                      If current day work time ≦0 then:
                          Let current day=(current day)+(1 day)
                          Let total work time=(total work time)+(travel time for the area)
                          Let current day work time=(travel time for the area)
                          Process current day.
            If booking fails then:
                Appointment request cannot be booked (failure: not enough available time).
        If total work time≦booking window time then:
            Attempt to book (total work time) in booking window.
            If booking succeeds (always true when appointment override flag is set) then:
                Appointment request is fully booked (success).
            If booking fails then:
                Appointment request cannot be booked (failure: not enough available time).}
        If booking window and booking pattern do not overlap then:
            If current day work time>0 then:
                Appointment request cannot be booked (failure: not enough available time).

If current day work time≦0 then:
  Let current day=(current day) (1 day)
  Let total work time=(total work time)+(travel time for the area)
  Let current day work time=(travel time for the area)
  Process current day.

Notes: This assumes that the booking pattern is valid, the requested date is valid, the requested window is valid on the requested date, the requested date is a working day for the booking pattern, and the requested window overlaps with the booking pattern.
  If appointment override flag is set, consider both non-excluded and excluded windows; otherwise, consider only non-excluded windows.
  If appointment override flag is set, an all day appointment type has been specified, and current day is "too far into the future", the effective size of the all day window is taken as the actual size of the all day window.
  Attempting to book 0 minutes to a window always succeeds. (This will occur when the effective size of a window is 0, that is when all working FSRs are on break for the duration of the window.)

DATA DICTIONARY

This section defines the data items that appear in prior sections of this description. Each data item is defined in terms of its associated fields. An "M" indicates a mandatory field. The data items are as follows: appointment cancellation request
  M CSR identifier
  M appointment identifier—unique integer appointment change request
  M appointment request (new)—except for area
  M appointment identifier for previously booked appointment unique—integer appointment list request
  M CSR identifier
  M area
  M job code job duration override—in minutes
  M requested date requested time
  M appointment type split time—in minutes booking pattern—must be present if split time is specified appointment log appointment identifier—unique integer, present for approved appointments
  M CSR identifier
  M booking date
  M booking time
  M area
  M job code skill code—present for approved appointments
  M requested date requested time—present for basic window appointments
  M appointment type booking log(s)—present for approved appointments error code—if the appointment is rejected booking log
    M work date work time—present for basic window appointments
    M appointment type
    M minutes booked in appointment window appointment request
  M CSR identifier
  M area
  M job code job duration override—in minutes
  M requested date requested time—present for basic window appointments
  M appointment type split time—in minutes booking pattern—must be present if split time is specified override indicator—forced booking even if it results in overbooking appointment time
  M work date
  M begin time
  M end time appointment type
  M one and only one of: all day, AM, PM, EV, basic area
  M mnemonic—character identifier description
  M travel time
  M number of days into the future that appointment bookings can occur—includes the current day, e.g., if this parameter is set to ten days, bookings can occur anytime between today and nine days from today
  M the cut-off time for booking same day appointments
  M how soon after booking the appointment work can be scheduled to begin on a same day appointment—the end time of the related window must be later than the current time by this amount skills and associated window hierarchies to be used for the area today and for all future dates
  M indication of whether the area is terminated booked appointment
  M appointment identifier—unique integer
  M booked date
  M booked begin time—earliest that FSR will show up
  M booked end time—latest that FSR will show up
  M time to complete work—in minutes, excluding travel time
  M travel time—in minutes Field Service Representative (FSR)
  M identifier
  M name
  M skill
  M home OSS component 202 area
  M enable for use with OSS component 202?—yes or no
  M percentage of time available for dated orders
  M percentage of time available for undated orders
  M indication of whether the FSR is terminated job code
  M code description
  M time to complete work—in minutes, excluding travel time
  M skill code(s)—prioritized list of skill codes based on the appropriateness of the skill to complete the job
  M indication of whether the job code is terminated rejected appointment information
  M work date work time present for basic window appointments
    M appointment type
  M minutes available for booking in the appointment window
  M minutes already booked in the appointment window
  M minutes to be booked in the appointment window shift
  M code
  M working period(s)
  M enable for use with OSS component 202?13 yes or no skill code (resource code)
  M code description
  M percentage of FSR's time available for dated orders—applies to FSRs with this primary skill
  M percentage of FSR's time available for undated orders—applies to FSRs with this primary skill
  M indication of whether the skill code is terminated statistics For each all day, aggregate, and basic window:
M area
M date
M skill code
M minutes available—in the current window only (i.e., no subordinate windows)
M minutes booked—in the current window only (i.e., no subordinate windows)
M number of orders—in the current window only (i.e., no subordinate windows)
M effective window size—in minutes
M total minutes remaining—minutes available in the current window minus total minutes booked in the current window total minutes booked—in the current window plus all subordinate windows; only for all day and aggregate windows
M total percentage booked—(total minutes booked/minutes available) * 100
M window begin time—for basic windows only
M window end time—for basic windows only
* For the purposes of statistics, excluding a window does not affect the amount of time available in that window or the related windows; it only affects the ability to book to that window. Therefore, the minutes available and minutes remaining values are not affected by the exclusion of the window; they show the same values as if the window was not excluded. However, it is likely that the minutes booked will be zero, unless the window was excluded after some appointments were already booked.
statistics request
M CSR identifier
M area
M requested date
M job code
  skill code—needed if request type is next, previous, or current
M request type—either first skill, next skill, previous skill, or current skill user
M identifier
M name
M password
M user class—either System Administrator or Manager
M indication of whether the user is terminated
M set of privileges window hierarchy
M mnemonic—character identifier
  description
  windows to be used by the window hierarchy today and all future dates.
    Windows include:
      all day start time
      all day end time
      AM start time
      AM end time
      PM start time
      PM end time
      EV start time
        EV end time
        basic window start time(s)
        basic window end time(s)
M indication of whether the window hierarchy is terminated booking pattern
M mnemonic—character identifier description
M days on—integer, greater than or equal to 1
M days off—integer, greater than or equal to 0
M anchor date
M start time
M end time
M indication of whether the booking pattern is terminated working periods
M start time
M start day of week
M end time
M end day of week
  lunch start time
  lunch duration
  break #1 start time
  break #1 end time
  break #2 start time
  break #2 end time It is to be understood that even though various embodiments and advantages of the present invention have been set forth in the foregoing description, the above disclosure is illustrative only, and changes may be made in detail, and yet remain within the broad principles of the invention. For example, some of the components described above may be implemented in software in a variety of languages, and also may be implemented in hardware using either digital or analog circuitry, or a combination of both. Therefore, the present invention is to be limited only by the appended claims.

The invention claimed is:

1. A computer-readable medium containing a program for scheduling splittable work orders to provide customers with requested service, the program scheduling the work orders by performing operations comprising:

receiving customer requests from customers desiring service;

identifying a received request for service from a customer as being a splittable work order having a job duration required to complete the splittable work order over a plurality of different days and a split time that is less than the job duration;

requesting an appointment in a specific appointment window on a first day in response to the received customer request, the appointment window being for the split time;

validating the requested appointment against a number of scheduling constraints and against projected service resources for that window on the first day, including dividing a service area into a number of work areas, assigning a field service representative to each work area where each field service representative has an associated skill level, assigning at least one skill level to each work area, and assigning at least one window hierarchy to each work area, each window hierarchy corresponding to a set of appointment windows and associated with at least one skill level assigned to the work area, the scheduling constraints having allowable appointment windows during which appointments are permitted to be scheduled;

scheduling the appointment in the specific appointment window on the first day when the validation indicates the appointment can be scheduled given the scheduling constraints and projected service resources, in response to the specific appointment window overlapping the allowable appointment window, time for the appointment scheduled in the specific appointment window proportionally to the amount of overlap between the specific appointment window and the allowable appointment window;

requesting an appointment in a specific appointment window on a subsequent day or days during which the remainder of the splittable work order may be scheduled;

validating the requested appointment against the number of scheduling constraints and against projected service resources for that window on the subsequent day or days;

scheduling the appointment in the specific appointment window on the subsequent day or days when the validation indicates the appointment can be scheduled given the scheduling constraints and projected service resources; and advising the customer of the scheduled appointment.

2. The computer-readable medium of claim 1 wherein the projected service resources comprise projected resources of field service representatives on the requested day and during the requested window.

3. The computer-readable medium of claim 1 wherein each window hierarchy comprises all day appointment windows, aggregate appointment windows, and basic appointment windows.

4. The computer-readable medium of claim 1 wherein receiving customer requests from customers desiring service comprises receiving telephone calls by customer service representatives of the company providing the service.

5. The computer-readable medium of claim 4 wherein advising the customer of the scheduled appointment comprises advising the customer over the telephone as part of the same telephone call initially received by the customer service representative.

6. A computer-readable medium containing a program for scheduling splittable work orders to provide customers with requested service, the program scheduling the work orders by performing operations comprising:

receiving customer requests from customers desiring service, the requests being received by customer service representatives;

identifying a received request for service from a customer as being a splittable work order having a job duration required to complete the splittable work order over a plurality of different days and a split time that is less than the job duration;

requesting an appointment in a specific appointment window on a first day in response to the received customer request, the appointment window being for the split time;

validating the requested appointment against a number of scheduling constraints and against projected service resources for that window on the first day, including dividing a service area into a number of work areas, assigning a field service representative to each work area where each field service representative has an associated skill level, assigning at least one skill level to each work area, and assigning at least one window hierarchy to each work area, each window hierarchy corresponding to a set of appointment windows and associated with at least one respective skill level assigned to the work area, the scheduling constraints having allowable appointment windows during which appointments are permitted to be scheduled;

scheduling the appointment in the specific appointment window on the first day when the validation indicates the appointment can be scheduled given the scheduling constraints and projected service resources, in response to the specific appointment window overlapping the allowable appointment window, time for the appointment scheduled in the specific appointment window proportionally to the amount of overlap between the specific appointment window and the allowable appointment window;

requesting an appointment in a specific appointment window on a subsequent day or days during which the remainder of the splittable work order may be scheduled;

validating the requested appointment against the number of scheduling constraints and against projected service resources for that window on the subsequent day or days;

scheduling the appointment in the specific appointment window on the subsequent day or days when the validation indicates the appointment can be scheduled given the scheduling constraints and projected service resources;

advising the customer of the scheduled appointment by the customer service representative; and if either validation fails,
providing the customer service representative with a set of alternate appointment windows over multiple days in which the splittable work order may be scheduled; and
advising the customer of the alternative appointment windows.

7. The computer-readable medium of claim 6 wherein providing the customer service representative with a set of alternate appointment windows over multiple days in which the splittable work order may be scheduled includes informing the customer service representative of the reason either validation failed.

8. The computer-readable medium of claim 7 wherein informing the customer service representative of the reason either or both validations failed includes providing the customer service representative with an indication that the reason for the failure was the result of insufficient projected service resources.

9. The computer-readable medium of claim 8 wherein providing the customer service representative with an indication that the reason for the failure was the result of insufficient projected service resources includes providing the representative with the degree to which the requested appointment windows are overbooked.

10. The computer-readable medium of claim 9 wherein the customer service representative schedules the requested appointment in the alternative appointment windows or schedules the appointment in the originally requested windows using an override procedure.

11. The computer-readable medium of claim 6 wherein the customer service representative requests a list of all available appointment windows into which the splittable work order may be scheduled when either validation failed, and the representative schedules the order into one of the available windows.

12. The computer-readable medium of claim 6 wherein the projected service resources comprise projected resources of field service representatives on the requested day and during the requested window.

13. The computer-readable medium of claim 6 wherein each window hierarchy comprises all day appointment windows, aggregate appointment windows, and basic appointment windows.

14. The computer-readable medium of claim 6 wherein advising the customer of the scheduled appointment comprises advising the customer over the telephone as part of the same telephone call initially received by the customer service representative.

* * * * *

UNITED STATES PATENT AND TRADEMARK OFFICE
CERTIFICATE OF CORRECTION

PATENT NO. : 7,587,327 B2
APPLICATION NO. : 09/825296
DATED : September 8, 2009
INVENTOR(S) : Simon Jacobs, John Thomas and Rob Anthony It is certified that error appears in the above-identified patent and that said Letters Patent is hereby corrected as shown below:

| References | Reads | Should Read |
|---|---|---|
| Page 3, Right Column, Line 34 | "Liu, R. et al., "A route-neighborhhod-based metaheuristic for vehicle routing problem with time windows," European journal of Reasearch, vol. 118, 1999, pp. 485-504." | Liu, R. et al., "A route-neighborhood-based metaheuristic for vehicle routing problem with time windows," European Journal of Reasearch, vol. 118, 1999, pp. 485-504. |

| Column, Line | Reads | Should Read |
|---|---|---|
| Column 5, Lines 28-29 | "The Manager is also may also maintain the OSS component 202 as previously" | The Manager may also maintain the OSS component 202 as previously" |
| Column 5, Line 41 | "The system tables 208 contain store basic configuration information" | The system tables 208 contain basic configuration information |
| Column 8, Line 16 | "Terminating a entries in the system table 208." | Terminating entries in the system table 208.---- |
| Column 9, Lines 15-16 | "(Notes: Neither FSR nor OSS Client is a user class in the OSS component 202." | (Notes: Neither FSR nor OSS Client is a user class in the OSS component 202).---- |

Signed and Sealed this

Tenth Day of August, 2010

David J. Kappos
*Director of the United States Patent and Trademark Office*

| | | |
|---|---|---|
| Column 11, Line 38 | "each must be defined such tha the start time corresponds to the" | each must be defined such that the start time corresponds to the" |
| Column 11, Line 42 | "Aggregate windows cannot overlap, the system" | Aggregate windows cannot overlap. The system---- |
| Column 16, Line 19 | "the component transmit an error message" | the component transmits an error message |
| Column 17, Line 32 | "and if ajob duration override is" | and if a job duration override is |
| Column 21, Line 57 | "and who's skill matches" | and whose skill matches |
| Column 21, Line 67 | "200, who's skill matches" | 200, whose skill matches |
| Column 22, Line 6 | "200, who's skill matches" | 200, whose skill matches |
| Column 22, Line 39 | "gate window=all time previously booked to its subor-" | gate window+all time previously booked to its subor- |
| Column 22, Line 40 | "-dinate basic windows=the time to be booked" | -dinate basic windows+the time to be booked |
| Column 22, Line 45 | "time previously booked to all aggi windows+all time" | time previously booked to all aggregate windows+all time |
| Column 22, Line 58 | "time previously booked to all aggi windows+all time" | time previously booked to all aggi windows+all time |
| Column 25, Line 2 | "Let current day=(current day) (1 day)" | Let current day=(current day)+(1 day) |

Delete text beginning at Column 25, Line 28, and ending at Column 28, Line 12, and substitute the following text with indentation as shown:

appointment cancellation request
    M CSR identifier
    M appointment identifier — unique integer appointment change request
    M appointment request (new) — except for area
    M appointment identifier for previously booked appointment — unique integer
appointment list request
    M CSR identifier
    M area
    M job code
      job duration override — in minutes
    M requested date
      requested time
    M appointment type
      split time — in minutes
      booking pattern — must be present if split time is specified
appointment log
      appointment identifier — unique integer, present for approved appointments
    M CSR identifier
    M booking date
    M booking time
    M area
    M job code
      skill code — present for approved appointments
    M requested date
      requested time — present for basic window appointments
    M appointment type
      booking log(s) — present for approved appointments
      error code — if the appointment is rejected
booking log
    M     work date
           work time — present for basic window appointments
    M     appointment type
    M     minutes booked in appointment window
appointment request
    M CSR identifier
    M area
    M job code
      job duration override — in minutes
    M requested date
      requested time — present for basic window appointments
    M appointment type
      split time — in minutes
      booking pattern — must be present if split time is specified
      override indicator — forced booking even if it results in overbooking
appointment time
    M work date
    M begin time
    M end time appointment type
    M one and only one of: all day, AM, PM, EV, basic
area
    M mnemonic — character identifier
    description
    M travel time
    M number of days into the future that appointment bookings can occur —
        includes the current day, e.g., if this parameter is set to ten days, bookings can
        occur anytime between today and nine days from today
    M the cut-off time for booking same day appointments
    M how soon after booking the appointment work can be scheduled to begin on
        a same day appointment — the end time of the related window must be later
        than the current time by this amount
    skills and associated window hierarchies to be used for the area today and for all future
        dates
    M indication of whether the area is terminated
booked appointment
    M appointment identifier — unique integer
    M booked date
    M booked begin time — earliest that FSR will show up
    M booked end time — latest that FSR will show up
    M time to complete work — in minutes, excluding travel time
    M travel time — in minutes
Field Service Representative (FSR)
    M identifier
    M name
    M skill
    M home OSS area
    M enable for use with OSS? — yes or no
    M percentage of time available for dated orders
    M percentage of time available for undated orders
    M indication of whether the FSR is terminated
job code
    M code
    description
    M time to complete work — in minutes, excluding travel time
    M skill code(s) — prioritized list of skill codes based on the appropriateness
        of the skill to complete the job
    M indication of whether the job code is terminated
rejected appointment information
    M work date
    work time — present for basic window appointments
        M    appointment type
    M minutes available for booking in the appointment window
    M minutes already booked in the appointment window
    M minutes to be booked in the appointment window shift
> M code
> M working period(s)
> M enable for use with OSS? — yes or no skill code (resource code)
> M code
> > description
>
> M percentage of FSR's time available for dated orders — applies to FSRs with this primary skill
> M percentage of FSR's time available for undated orders — applies to FSRs with this primary skill
> M indication of whether the skill code is terminated statistics
> For each all day, aggregate, and basic window:
> M area
> M date
> M skill code
> M minutes available — in the current window only (i.e., no subordinate windows)
> M minutes booked — in the current window only (i.e., no subordinate windows)
> M number of orders — in the current window only (i.e., no subordinate windows)
> M effective window size — in minutes
> M total minutes remaining — minutes available in the current window minus total minutes booked in the current window
> > total minutes booked — in the current window plus all subordinate windows; only for all day and aggregate windows
>
> M total percentage booked — (total minutes booked / minutes available) * 100
> M window begin time — for basic windows only
> M window end time — for basic windows only
> \* For the purposes of statistics, excluding a window does not affect the amount of time available in that window or the related windows; it only affects the ability to book to that window. Therefore, the minutes available and minutes remaining values are not affected by the exclusion of the window; they show the same values as if the window was not excluded. However, it is likely that the minutes booked will be zero, unless the window was excluded after some appointments were already booked, statistics request
> M CSR identifier
> M area
> M requested date
> M job code
> > skill code — needed if request type is next, previous, or current
>
> M request type — either first skill, next skill, previous skill, or current skill user
> M identifier
> M name M password  
        M user class — either System Administrator or Manager  
        M indication of whether the user is terminated  
        M set of privileges  
window hierarchy  
        M mnemonic — character identifier  
           description  
           windows to be used by the window hierarchy today and all future dates.  
                Windows include:  
                      all day start time  
                      all day end time  
                      AM start time  
                      AM end time  
                      PM start time  
                      PM end time  
                      EV start time  
                          EV end time  
                          basic window start time(s)  
                          basic window end time(s)  
        M indication of whether the window hierarchy is terminated  
booking pattern  
        M mnemonic — character identifier  
           description  
        M days on — integer, greater than or equal to 1  
        M days off — integer, greater than or equal to 0  
        M anchor date  
        M start time  
        M end time  
        M indication of whether the booking pattern is terminated  
working periods  
        M start time  
        M start day of week  
        M end time  
        M end day of week  
           lunch start time  
           lunch duration  
           break #1 start time  
           break #1 end time  
           break #2 start time  
           break #2 end time